United States Patent
Sato

(10) Patent No.: US 12,448,570 B2
(45) Date of Patent: Oct. 21, 2025

(54) LIQUID CRYSTAL ELEMENT AND EMULSION COMPOSITION

(71) Applicant: Mitsubishi Chemical Corporation, Tokyo (JP)

(72) Inventor: Hideki Sato, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 18/239,906

(22) Filed: Aug. 30, 2023

(65) Prior Publication Data

US 2023/0399567 A1    Dec. 14, 2023

Related U.S. Application Data

(63) Continuation of application No. PCT/JP2022/007810, filed on Feb. 25, 2022.

(30) Foreign Application Priority Data

Mar. 1, 2021    (JP) .................................. 2021-031559

(51) Int. Cl.
G02F 1/1334    (2006.01)
C09K 19/38    (2006.01)
C09K 19/60    (2006.01)

(52) U.S. Cl.
CPC ............. *C09K 19/601* (2013.01); *C09K 19/38* (2013.01); *C09K 19/603* (2013.01); *C09K 2219/03* (2013.01); *C09K 2219/15* (2013.01); *C09K 2219/17* (2013.01)

(58) Field of Classification Search
CPC .... C09K 19/601; C09K 19/38; C09K 19/603; C09K 2219/03; C09K 2219/15; G02F 1/1334; G02F 1/137
See application file for complete search history.

(56) References Cited

U.S. PATENT DOCUMENTS

| | | | |
|---|---|---|---|
| 4,992,201 A | 2/1991 | Pearlman | |
| 10,114,264 B2 | 10/2018 | Junge et al. | |
| 10,336,940 B2 | 7/2019 | Junge et al. | |
| 10,655,067 B2 | 5/2020 | Junge et al. | |
| 11,524,559 B2 * | 12/2022 | Hwang | G02F 1/1334 |
| 2019/0278115 A1 | 9/2019 | Khan et al. | |
| 2023/0399567 A1 * | 12/2023 | Sato | G02F 1/1334 |

FOREIGN PATENT DOCUMENTS

| | | | | |
|---|---|---|---|---|
| JP | S60-252687 A | | 12/1985 | |
| JP | H09218395 | * | 8/1997 | .......... G02F 1/1333 |
| JP | 2000-347223 A | | 12/2000 | |
| JP | 2001-042793 A | | 2/2001 | |
| JP | 2011-190314 A | | 9/2011 | |
| JP | 2013-152445 A | | 8/2013 | |
| JP | 2016-510907 A | | 4/2016 | |
| JP | 2016-536634 A | | 11/2016 | |
| JP | 2017-511895 A | | 4/2017 | |
| JP | 2019-502958 A | | 1/2019 | |
| WO | 2004/005426 A1 | | 1/2004 | |
| WO | 2015/117736 A1 | | 8/2015 | |
| WO | 2018/159303 A1 | | 9/2018 | |

OTHER PUBLICATIONS

Machine Translation of JP H09218395 (Year: 1997).*
Higgins, "Probing the Mesoscopic Chemical and Physical Properties of Polymer-Dispersed Liquid Crystals," Advanced Materials, 12 (4): 251-264 (2000).
International Search Report issued in related International Patent Application No. PCT/JP2022/007810 dated May 10, 2022.

* cited by examiner

*Primary Examiner* — Geraldina Visconti
(74) *Attorney, Agent, or Firm* — Morgan, Lewis & Bockius LLP

(57) ABSTRACT

A liquid crystal element including: two substrates having a transparent conductive layer formed thereon, the substrates being arranged so that the transparent conductive layers face each other, and a liquid crystal-polymer composite film sandwiched between the two substrates having a transparent conductive layer, wherein the liquid crystal-polymer composite film includes a polymer matrix and a liquid crystal composition surrounded by the polymer matrix, the liquid crystal composition contains a liquid crystal component and a dichroic dye, the liquid crystal component has positive dielectric constant anisotropy, and has an NI point of 110° C. or higher and 150° C. or lower, the liquid crystal component has a refractive index anisotropy of 0.01 or more and 0.1 or less, and the liquid crystal-polymer composite film can be switched between a transparent state and a colored state by applying a voltage.

20 Claims, 2 Drawing Sheets

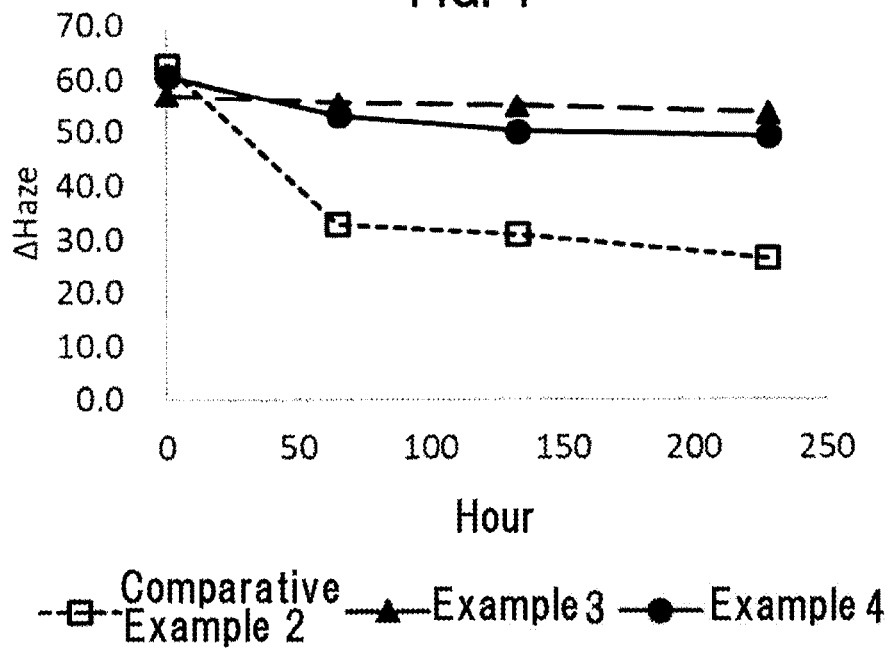
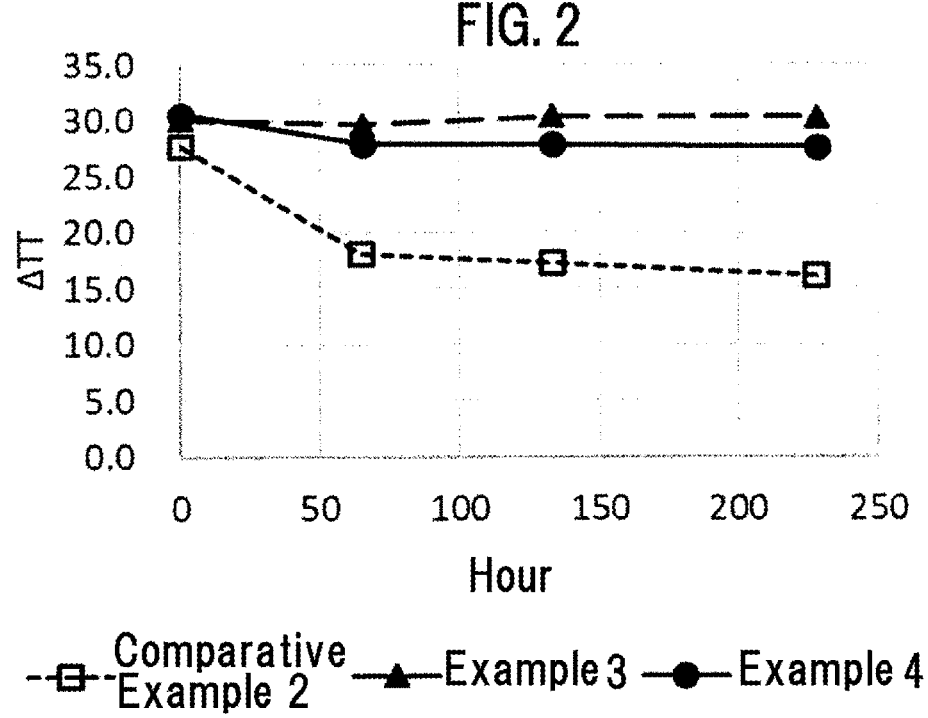

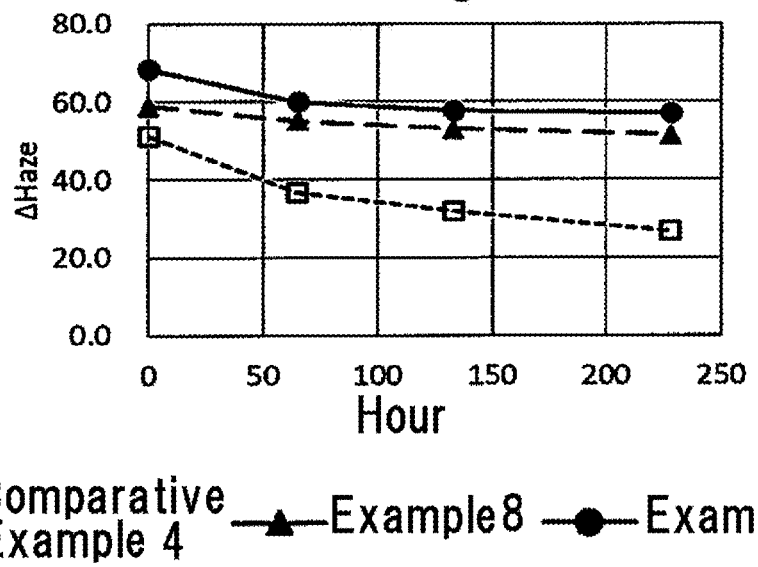
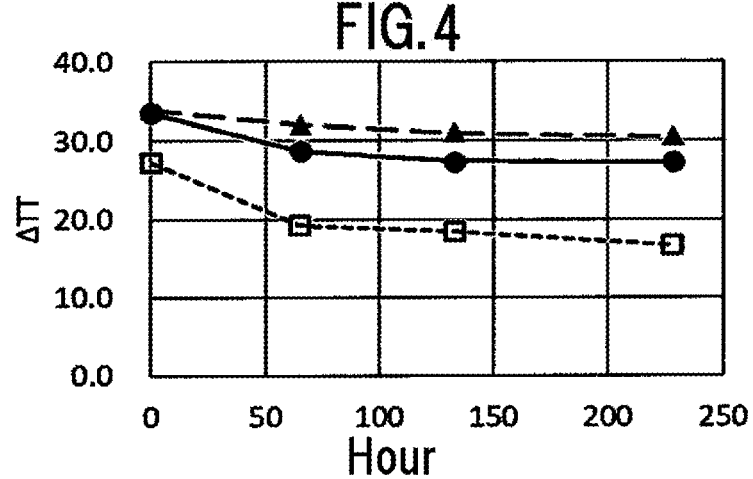

LIQUID CRYSTAL ELEMENT AND EMULSION COMPOSITION

TECHNICAL FIELD

The present invention relates to a liquid crystal element and an emulsion composition. More specifically, the present invention relates to a liquid crystal element capable of switching between a transparent state and a colored state, and an emulsion composition that can be used in the liquid crystal element.

BACKGROUND ART

In recent years, the demand for smart glass that can electrically switch the transparency of the glass has increased. A liquid crystal system, an electrochromic system, an SPD (Suspend Particle Device) system, and the like have been proposed as light modulating materials used in smart glass. Among these, the liquid crystal system has been attracting attention because of its overwhelmingly short response time and less stress on the user.

Among liquid crystal systems, a PDLC (Polymer Dispersed Liquid Crystals) is widely known (NPL 1). A PDLC has a structure in which a liquid crystal-polymer composite film including liquid crystal droplets dispersed in a polymer matrix is sandwiched between two transparent conductive substrates.

Normal mode driving is most common among PDLCs. When no voltage is applied to a PDLC of the normal mode driving liquid crystal molecules are oriented along walls of a polymer matrix. In this case, there is a refractive index mismatch between the liquid crystal regions and the polymer matrix. This mismatch causes light scattering and cloudiness, which functions as a blindfold. On the other hand, when a voltage is applied to the PDLC, the liquid crystal molecules are oriented in the direction of the electric field. As a result, the liquid crystal region and the polymer matrix have the same refractive index and become transparent by transmitting light.

A PDLC has been put to practical use as a dimming shutter for the purpose of design and privacy protection in windows, doors, partitions, etc. of vehicles such as trains and automobiles, business buildings, hospitals, etc. A PDLC is also used as a display element for displaying characters and graphics.

As a PDLC has flexibility due to the structure of the liquid crystal-polymer composite film described above, the PDLC can be a film element. In addition, the film elements can be cut and shaped. Taking advantage of such characteristics, a user can easily apply the film element to glass.

In recent years, due to the growing interest in energy conservation, attempts have been made to reduce the heating and cooling load by using smart glass for windows and controlling the amount of solar radiation entering the room. A PDLC can be switched between light scattering and non-light scattering, but most of the scattering is forward scattering, so that light passes through the element. Therefore, it is almost impossible to control the amount of transmitted light, and it can not contribute to energy saving.

PTLs 1 to 3 disclose guest-host liquid crystal (GH liquid crystal) type smart glass in which a dichroic dye is added to the liquid crystal. Since the guest-host liquid crystal system is a system of switching between a transparent state and a colored state by electrically switching the absorbance of a liquid crystal element, the guest-host liquid crystal system can control the amount of transmitted light. However, in order to make the guest-host liquid crystal into a film element that can be cut and shaped, a matrix that surrounds the liquid crystal and supports the film structure like PDLC is required.

PTLs 4 to 6 disclose a guest-host PDLC, which is a combination of PDLC and guest-host liquid crystal. These are expected as film elements capable of controlling the amount of transmitted light.

In PTL 4, a liquid crystal-polymer composite film is produced by polymerization-induced phase separation by photopolymerization. In the method of PTL 4, the dichroic dye in the liquid crystal absorbs light to inhibit photopolymerization. As a result, poor curing of the polymer matrix occurs, which poses a problem in the reliability of the liquid crystal element. This problem becomes a serious problem especially when the light shielding property of the liquid crystal element is to be improved.

In PTL 5, a liquid crystal-polymer composite film is produced using an aqueous emulsion composition. The production method using this emulsion composition makes it easier to obtain a desired film structure than the production method using polymerization-induced phase separation in PTL 4. Moreover, there is an advantage that deterioration of reliability due to poor curing of the polymer matrix does not occur. Therefore, it is possible to obtain a liquid crystal element having a higher light-shielding property.

PTL 5 discloses that when the birefringence ($\Delta n$) of the liquid crystal is 0.15 or less and the order parameter S of the dichroic dye is 0.75 or more, the change width of the visible light transmittance of the PDLC is 30% or more and the haze in the transparent state is 10% or less.

However, the visible light transmittance thereof indicates the linear transmittance of straight light that does not include scattered light. For this reason, when the forward scattered light is included, the change width of the amount of transmitted light is very small, and accordingly there is a problem that the amount of solar radiation can hardly be controlled.

In PTL 6, by controlling the refractive index anisotropy and the order parameter of the guest-host liquid crystal, a liquid crystal element having a wide change width (dynamic range) of visible light transmittance and low haze is obtained.

However, the liquid crystal element of PTL 6 has a problem that the dynamic range of visible light transmittance changes when it is driven at high temperature for a long time, and accordingly the reliability is not sufficient. In automobile applications, as the temperature inside the car become high occasionally, such a change in dynamic range becomes an obstacle in developing the liquid crystal element for use in automobiles.

PLT 1: JP 2016-510907 A
PLT 2: JP 2016-536634 A
PLT 3: JP 2017-511895 A
PLT 4: JP 2011-190314 A
PLT 5: JP S60-252687 A
PLT 6: JP 2000-347223 A
NPL 1: D. A. Higgins, Advanced Materials 2000, 12, No. 4

SUMMARY OF INVENTION

It is an object of the present invention to provide a liquid crystal element in which the amount of transmitted light can be electrically controlled and which can be cut and shaped, and which has a high dynamic range of visible light transmittance and a small decrease in the dynamic range even after being driven at a high temperature.

The present inventors have found that the change width (dynamic range) of the visible light transmittance of the liquid crystal element is increased, and the dynamic range is maintained even after being driven at a high temperature, by using a liquid crystal component having a predetermined dielectric constant anisotropy and a refractive index anisotropy as a liquid crystal component in a liquid crystal composition containing a liquid crystal component and a dichroic dye, and increasing its NI point (nematic phase-isotropic phase transition temperature). The present invention was completed based on such findings. That is, the gist of the present invention resides in the following.

[1] A liquid crystal element comprising:
two substrates having a transparent conductive layer formed thereon, the substrates being arranged so that the transparent conductive layers face each other, and
a liquid crystal-polymer composite film sandwiched between the two substrates having a transparent conductive layer,
wherein the liquid crystal-polymer composite film comprises a polymer matrix and a liquid crystal composition surrounded by the polymer matrix,
the liquid crystal composition contains a liquid crystal component and a dichroic dye,
the liquid crystal component has positive dielectric constant anisotropy, and has an NI point of 110° C. or higher and 150° C. or lower,
the liquid crystal component has a refractive index anisotropy of 0.01 or more and 0.1 or less, and
the liquid crystal-polymer composite film can be switched between a transparent state and a colored state by applying a voltage.

[2] The liquid crystal element according to [1], wherein the liquid crystal composition has an average droplet diameter of 2 µm or more and 50 µm or less.

[3] The liquid crystal element according to [1], wherein the liquid crystal composition has an average droplet diameter of 0.01 µm or more and less than 2 µm.

[4] The liquid crystal element according to any one of [1] to [3], wherein the dichroic dye contains an anthraquinone dye and/or an azo dye.

[5] The liquid crystal element according to any one of [1] to [4], wherein the content of the dichroic dye with respect to 100% by mass of the liquid crystal composition is 0.1% by mass or more and 20% by mass or less.

[6] The liquid crystal element according to any one of [1] to [5], wherein the liquid crystal component is a nematic liquid crystal or a chiral nematic liquid crystal.

[7] The liquid crystal element according to any one of [1] to [6], wherein a polymer constituting the polymer matrix contains at least one selected from the group consisting of polyurethane, polyacryl, polyvinyl alcohol and a modified product thereof.

[8] The liquid crystal element according to any one of [1] to [7], wherein the total light transmittance in the colored state is 0.1% or more and 30% or less.

[9] The liquid crystal element according to any one of [1] to [8], wherein the total light transmittance in the transparent state is more than 30% and 80% or less.

[10] An emulsion composition in which a liquid crystal composition is dispersed in a medium containing water,
wherein a polymer is dispersed or dissolved in the medium,
the liquid crystal composition contains a liquid crystal component and a dichroic dye,
the liquid crystal component has positive dielectric constant anisotropy, and has an NI point of 110° C. or higher and 150° C. or lower,
the liquid crystal component has a refractive index anisotropy of 0.01 or more and 0.1 or less,

[11] The emulsion composition according to [10], wherein the liquid crystal composition in the emulsion composition has an average droplet diameter of 2 µm or more and 50 µm or less.

[12] The emulsion composition according to [10], wherein the liquid crystal composition in the emulsion composition has an average droplet diameter of 0.01 µm or more and less than 2 µm.

[13] The emulsion composition according to any one of [10] to [12], wherein the dichroic dye contains an anthraquinone dye and/or an azo dye.

[14] The emulsion composition according to any one of [10] to [13], wherein the content of the dichroic dye with respect to 100% by mass of the liquid crystal composition is 0.1% by mass or more and 20% by mass or less.

[15] The emulsion composition according to any one of [10] to [14], wherein the liquid crystal component is a nematic liquid crystal or a chiral nematic liquid crystal.

[16] The emulsion composition according to any one of [10] to [15], wherein the polymer contains at least one selected from the group consisting of polyurethane, polyacryl, polyvinyl alcohol and a modified product thereof.

Advantageous Effects of Invention

According to the present invention, there is provided a liquid crystal element that can electrically control the amount of transmitted light and that can be cut and shaped. In addition, the element achieves both high light-shielding properties and a wide dynamic range, and suppresses a decrease in the dynamic range even when it is driven at a high temperature.

The liquid crystal element of the present invention is useful for windows, screens, displays, etc. due to the above properties. For example, the liquid crystal element of the present invention can be used as a view blocking element for windows, partitions, and the like of buildings and vehicles. Moreover, the liquid crystal element of the present invention can be used as a display for billboards, show windows, computer terminals, projections, and the like.

As the liquid crystal element of the present invention has particularly high driving reliability at a high temperature, it is particularly useful in environments where the temperature rises due to direct sunlight etc., for example, in automobile applications.

BRIEF DESCRIPTION OF DRAWINGS

FIG. 1 is a chart showing the haze (dynamic range ΔHaze) after 65 hours, 133 hours, and 228 hours from the start of continuous driving in Examples 3 and 4 and Comparative Example 2.

FIG. 2 is a chart showing the total light transmittance (dynamic range ΔTT) after 65 hours, 133 hours, and 228 hours from the start of continuous driving in Examples 3 and 4 and Comparative Example 2.

FIG. 3 is a chart showing the haze (dynamic range ΔHaze) after 65 hours, 133 hours, and 228 hours from the start of continuous driving in Examples 7 and 8 and Comparative Example 4.

FIG. 4 is a chart showing the total light transmittance (dynamic range ΔTT) after 65 hours, 133 hours, and 228 hours from the start of continuous driving in Examples 7 and 8 and Comparative Example 4.

DESCRIPTION OF EMBODIMENTS

The present invention will be described in detail below. The following description is an example of an embodiment of the present invention, and the present invention is not limited to the following description content and can be modified and implemented, as long as it does not exceed the gist of the present invention.

(Liquid Crystal Element)

The liquid crystal element of the present invention comprises two substrates having a transparent conductive layer formed thereon, the substrates being arranged so that the transparent conductive layers face each other, and a liquid crystal-polymer composite film being sandwiched between the two substrates having a transparent conductive layer, wherein the liquid crystal-polymer composite film comprises a polymer matrix and a liquid crystal composition surrounded by the polymer matrix, the liquid crystal composition contains a liquid crystal component and a dichroic dye, the liquid crystal component has positive dielectric constant anisotropy, and has an NI point of 110° C. or higher and 150° C. or lower, the liquid crystal component has a refractive index anisotropy of 0.01 or more and 0.1 or less, and the liquid crystal-polymer composite film can be switched between a transparent state and a colored state by applying a voltage.

[Mechanism]

In the liquid crystal element of the present invention, the liquid crystal-polymer composite film has a polymer matrix and a liquid crystal composition surrounded by the polymer matrix. Therefore, the liquid crystal element of the present invention has flexibility and can be cut and shaped. Since the liquid crystal composition contains a liquid crystal component and a dichroic dye, it can exhibit sufficient light absorption ability in a colored state. In addition, since the NI point of the liquid crystal component is 110° C. or more and 150° C. or less, the dynamic range is wide, and the dynamic range can be kept long even when it is driven at a high temperature. One way to widen the dynamic range is to increase the degree of order (order parameter) of the liquid crystal. The degree of order tends to be higher as the NI point is higher. However, if the NI point is too high, the lower limit temperature for operating as a nematic phase rises and is out of the practical temperature range. Specifically, when the NI point exceeds 150° C., the lower limit of operation as a nematic phase often exceeds 0° C. Therefore, the NI point of the liquid crystal component used in the present invention is set to 150° C. or lower.

The dielectric constant anisotropy (Δε) of the liquid crystal component used in the present invention is positive. Therefore, the obtained liquid crystal-polymer composite film is in a transparent state when a voltage is applied, and is in a colored state when no voltage is applied. However, it may have a memory property that requires voltage application only when it is switched between the transparent state and the colored state.

In the present invention, voltage refers to DC voltage, AC voltage, pulse voltage, or a combination thereof that has an effective value equal to or greater than a threshold.

In the present invention, the transparent state represents the state of the liquid crystal-polymer composite film when the voltage is applied or when no voltage is applied, and the state where the liquid crystal-polymer composite film has a higher total light transmittance between when a voltage is applied and when no voltage is applied is defined as a transparent state.

In addition, in the present invention, the colored state represents the state of the liquid crystal-polymer composite film when the voltage is applied or when no voltage is applied, and the state where the liquid crystal-polymer composite film has a smaller total light transmittance between when a voltage is applied and when no voltage is applied is defined as a colored state.

[Liquid Crystal-Polymer Composite Film]

The liquid crystal-polymer composite film (hereinafter sometimes referred to as the "liquid crystal-polymer composite film of the present invention") contained in the liquid crystal element of the present invention comprises a polymer matrix (hereinafter sometimes referred to as the "polymer matrix of the present invention") and a liquid crystal composition (hereinafter sometimes referred to as "the liquid crystal composition of the present invention") surrounded by the polymer matrix. Such liquid crystal-polymer composite films are commonly known as a PDLC.

The liquid crystal-polymer composite film has a polymer matrix and a liquid crystal composition surrounded by the polymer matrix, so that the liquid crystal element has flexibility. Moreover, by having such a structure, leakage of the liquid crystal composition can be minimized even when the liquid crystal element is cut. In addition, since the polymer matrix protects the liquid crystal composition from deterioration factors such as oxygen and moisture etc., cutting and shaping becomes possible.

<Liquid Crystal Composition>

The liquid crystal composition of the present invention may be dispersed in a polymer matrix or may be arranged regularly.

The shape of the liquid crystal composition of the present invention may be a true sphere, a spheroid, a cylinder or a regular polygonal prism such as a regular triangular prism, a regular square prism, a regular hexagonal prism etc. Also, these shapes may be distorted. Among these, a true sphere, a spheroid, a cylinder, and a regular polygonal prisms such as a regular triangular prism, a regular square prism, and a regular hexagonal prism etc. are preferred, because they tend to weaken the light scattering of the liquid crystal-polymer composite film, increase the light absorption of the dichroic dye during coloring, and reduce the haze in the transparent state.

Regarding the size of the liquid crystal composition, from the viewpoint of the transparency of the resulting element, the average droplet diameter when observed from the surface of the liquid crystal-polymer composite film is preferably 2 μm or more, and more preferably 5 μm or more. Moreover, it is preferably 50 μm or less, and more preferably 30 μm or less. When the average droplet diameter is at least the above lower limit, the light scattering of the liquid crystal-polymer composite film tends to be weak, and the haze in the transparent state tends to be small. At the same time, the light scattering of the liquid crystal-polymer composite film in the colored state is also weakened, so that the contribution of the dichroic dye to the light absorption is relatively improved, and it becomes possible to control the total light transmittance with a more transparent feeling. When the average droplet diameter is equal to or less than the above upper limit, the graininess of the liquid crystal composition disappears, and the uniformity of the appearance of the liquid crystal element tends to be improved.

Regarding the size of the liquid crystal composition, from the viewpoint of the light-shielding property of the obtained element, the average droplet diameter when observed from the film surface of the liquid crystal-polymer composite film is preferably 0.01 µm or more, and more preferably 0.1 µm or more. In addition, it is preferably less than 2 µm, more preferably 1 µm or less. When the average droplet diameter is less than the above upper limit, the liquid crystal-polymer composite film tends to have strong light scattering, a large haze in a light-shielding state, and a large dynamic range (a difference in haze between a colored state and a transparent state). At the same time, the opportunity for light absorption by the dichroic dye due to multiple scattering increases, the total light transmittance tends to be lower, and the dynamic range (difference in total light transmittance between the colored state and the transparent state) tends to increase. However, when the average droplet diameter is smaller than the above lower limit (much smaller than the wavelength of visible light), the effect is diminished, so the average droplet diameter of the liquid crystal composition is preferably at least the above lower limit.

The above average droplet diameter of the liquid crystal composition is the number-based median diameter.

When the shape of the liquid crystal composition observed from the film surface of the liquid crystal-polymer composite film is not a circle but an ellipse or a polygon such as a triangle, a square, or a hexagon, or when these shapes are distorted, the droplet diameter should refer to the diameter of the minimum containing circle.

The liquid crystal composition of the present invention comprises a liquid crystal component (hereinafter sometimes referred to as "the liquid crystal component of the present invention") and a dichroic dye (hereinafter sometimes referred to as "the dichroic dye of the present invention"). Such liquid crystal compositions are generally known as guest-host liquid crystals.

Although not particularly limited, the content of the dichroic dye with respect to 100% by mass of the liquid crystal composition is preferably 0.1% by mass or more, more preferably 1% by mass or more, and still more preferably 3% by mass or more. Also, the content of the dichroic dye with respect to 100% by mass of the liquid crystal composition is preferably 20% by mass or less, more preferably 15% by mass or less, and still more preferably 10% by mass or less.

When the content of the dichroic dye is equal to or higher than the above lower limit, the liquid crystal element exhibits greater light absorption depending on the colored state, and the amount of transmitted light tends to decrease. When the content of the dichroic dye is equal to or less than the above upper limit, separation and precipitation of the dichroic dye are less likely to occur, and the reliability of the liquid crystal element tends to improve.

The liquid crystal composition may contain additives within a range that does not impair the performance of the liquid crystal element of the present invention. Specifically, the liquid crystal composition may include a polymer precursor, a polymerization initiator, a light stabilizer, an antioxidant, a thickener, a polymerization inhibitor, a photosensitizer, an adhesive, an antifoaming agent, a surfactant, a chiral agent or the like.

The chiral agent may be any chiral compound that is compatible with the liquid crystal component, and may be a synthetic product or a commercially available product. Further, the chiral agent may an agent that exhibits liquid crystallinity itself, or may have a polymerizable functional group. Furthermore, the chiral agent may be dextrorotatory or levorotatory, and a dextrorotatory chiral agent and a levorotatory chiral agent may be used in combination.

In addition, as the chiral agent, one having a large positive dielectric constant anisotropy and a low viscosity is preferable from the viewpoint of reducing the driving voltage and the response speed of the liquid crystal element. It is preferable that the helical twisting power, which is an index of the force of the chiral agent to twist the liquid crystal, is large.

Commercially available chiral agents include, for example, CB15 (trade name: manufactured by Merck), C15 (trade name: manufactured by Merck), S-811 (trade name: manufactured by Merck), R-811 (trade name: manufactured by Merck), S-1011 (trade name, manufactured by Merck), R-1011 (trade name, manufactured by Merck), and the like.

When the liquid crystal composition of the present invention contains a chiral agent, the content is not particularly limited. The reciprocal number (1/p) of the chiral pitch p [µm] determined by an amount ratio of the liquid crystal component and the chiral agent is preferably 0.01 to 0.5 [/µm], and particularly preferably 0.01 to 0.3 [/µm]. When the reciprocal of the chiral pitch (1/p) is at least the above lower limit, the light absorption efficiency of the dichroic dye increases, and the light shielding property in the colored state can be improved. When the reciprocal of the chiral pitch (1/p) is equal to or less than the above upper limit, voltage rise can be suppressed.

<Liquid Crystal Component>

The dielectric constant anisotropy ($\Delta\varepsilon$) of the liquid crystal component of the present invention is positive. In this case, it becomes a normal mode in which a colored state is obtained when no voltage is applied and a transparent state is obtained when a voltage is applied.

The NI point (nematic phase-isotropic phase transition temperature) of the liquid crystal component of the present invention is 110° C. or higher and 150° C. or lower, and preferably 120° C. or higher and 140° C. or lower. When the NI point is equal to or higher than the above lower limit, there is a tendency that the dynamic range of change in transmittance can be maintained even in continuous driving at a high temperature of about 90° C. Also, the higher the NI point, the wider the dynamic range of transmittance change. On the other hand, when the NI point rises, the lower temperature limit of the nematic phase also tends to rise. Therefore, from the viewpoint of operation at a low temperature, the NI point is preferably equal to or less than the above upper limit.

The method for measuring the NI point of the liquid crystal component is not particularly limited, but the NI point of the liquid crystal component can be obtained by compatibilizing the liquid crystal composition, and observing phase transition or phase separation due to temperature rise with a polarizing microscope.

The refractive index anisotropy ($\Delta n$) of the liquid crystal component of the present invention is 0.01 or more, preferably 0.02 or more, and more preferably 0.03 or more. Moreover, it is 0.1 or less, and preferably 0.10 or less. When $\Delta n$ is equal to or less than the upper limit, light scattering at the interface between the polymer matrix and the liquid crystal composition is reduced, and haze in the transparent state tends to be reduced. On the other hand, when $\Delta n$ is equal to or greater than the above lower limit, the order parameter of the liquid crystal composition tends to increase.

The refractive index anisotropy of the liquid crystal component can be obtained as the difference ($\Delta n = n_e - n_o$) by directly obtaining the ordinary refractive index ($n_o$) and the extraordinary refractive index ($n_e$) of the liquid crystal component. If it is difficult to determine directly, it can be obtained also by determining the phase difference (retardation: R) when passing through a sample having a thickness d, and dividing it by the thickness d (R=Δnd).

As the liquid crystal contained in the liquid crystal component, a nematic liquid crystal, a cholesteric liquid crystal, a smectic liquid crystal, and the like can be used. Nematic liquid crystals or cholesteric liquid crystals are preferred because they are available at low cost. A chiral agent may be added to a nematic liquid crystal to form a cholesteric liquid crystal (a chiral nematic liquid crystal).

When using a known liquid crystalline substance as a liquid crystal component, various low-molecular-weight compounds or mixtures such as biphenyl-based, phenylcyclohexane-based, and cyclohexylcyclohexane-based, or mixtures described in "Liquid Crystal Handbook" edited by the 142nd Committee of the Japan Society for the Promotion of Science; Nihon Kogyo Shimbun (1989), pp. 152 to 192, and "Liquid Crystal Handbook" edited by the Liquid Crystal Handbook Editing Committee; Maruzen Co., Ltd. (2000), pp. 260 to 330 can be used specifically. In addition, high-molecular compounds or mixtures such as those described in "Liquid Crystal Handbook" edited by Liquid Crystal Handbook Editing Committee; Maruzen Co., Ltd. (2000), pp. 365 to 415 can also be used. Examples of the compound forming the nematic liquid crystal include the following compounds.

[CHEM. 1]

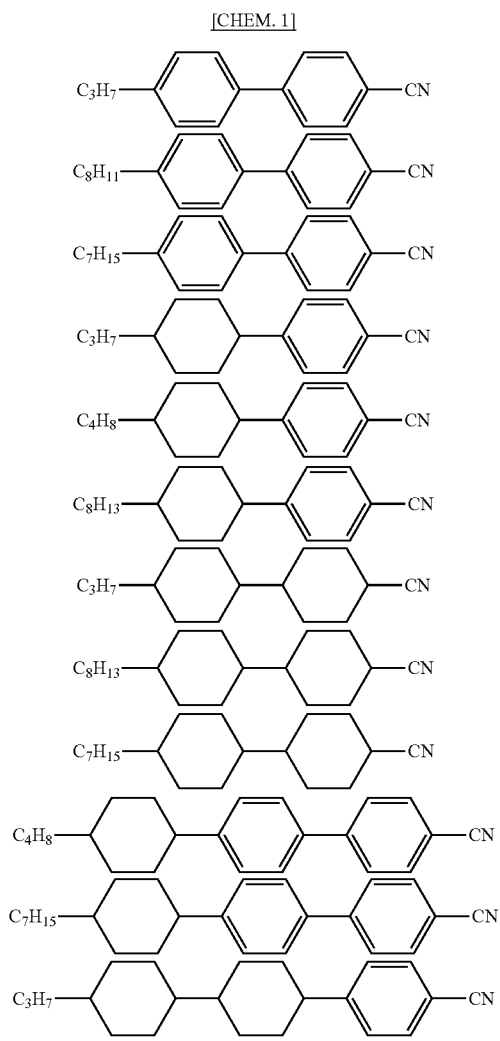

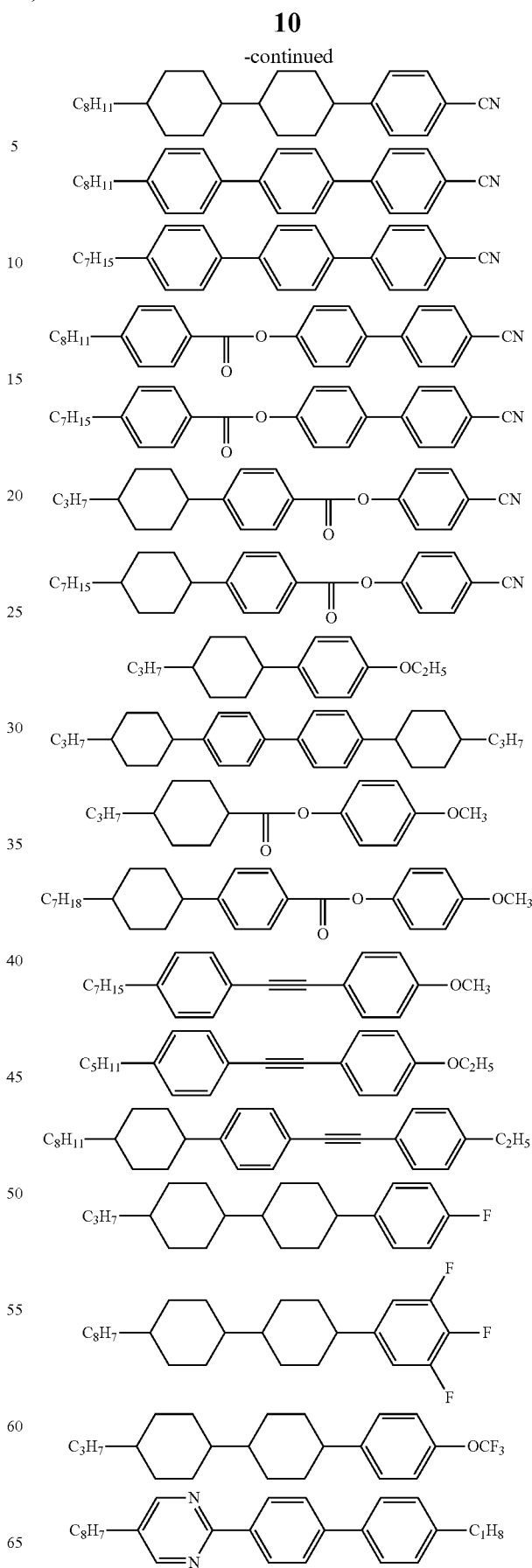

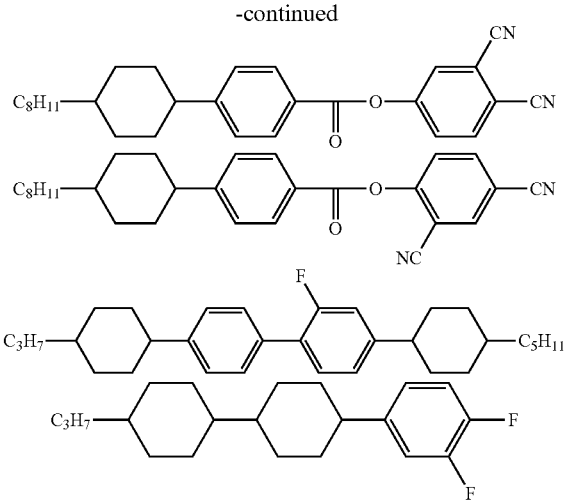

Nematic liquid crystals and cholesteric liquid crystals (chiral nematic liquid crystals) having low viscosity and high dielectric constant anisotropy are preferable from the viewpoint of high-speed response of liquid crystal elements and ease of production of emulsions.

<Dichroic Dye>

The dichroic dye contained in the liquid crystal composition of the present invention may be any dichroic dye compound compatible with the liquid crystal component. The dichroic dye may be a dichroic dye having a positive Δε or a dichroic dye having a negative as. Further, the dichroic dye may be one that exhibits liquid crystallinity itself.

Specific examples of dichroic dyes of the present invention include azo-based dyes, anthraquinone-based dyes, naphthoquinone-based dyes, perylene-based dyes, quinophthalone-based dyes, tetrazine-based dyes, and benzothiadiazole-based dyes. When using a known dichroic dye, azo-based dyes, anthraquinone-based dyes or mixtures thereof as described in "Liquid Crystal Handbook" edited by the 142nd Committee of the Japan Society for the Promotion of Science; Nihon Kogyo Shimbun (1989), pp. 192 to 196 and pp. 724 to 730 can be used. Among these, anthraquinone-based dyes or azo-based dyes are preferable because they tend to have a large absorption coefficient, a high solubility in liquid crystal components, and high light resistance.

A single kind of dichroic dye may be used, or a mixture of multiple kinds may be used. Although not particularly limited, the dichroic dye preferably contains 20% by mass or more, and more preferably 50% by mass or more, of the anthraquinone-based and/or azo-based type.

Specific examples of the dichroic dye of the present invention include compounds represented by the following formulas.

[CHEM. 2]

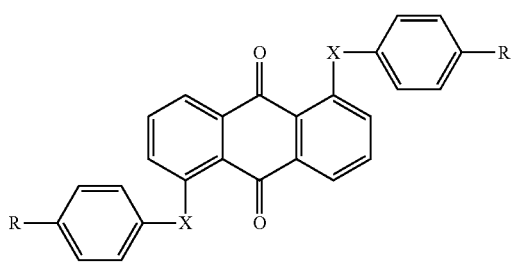

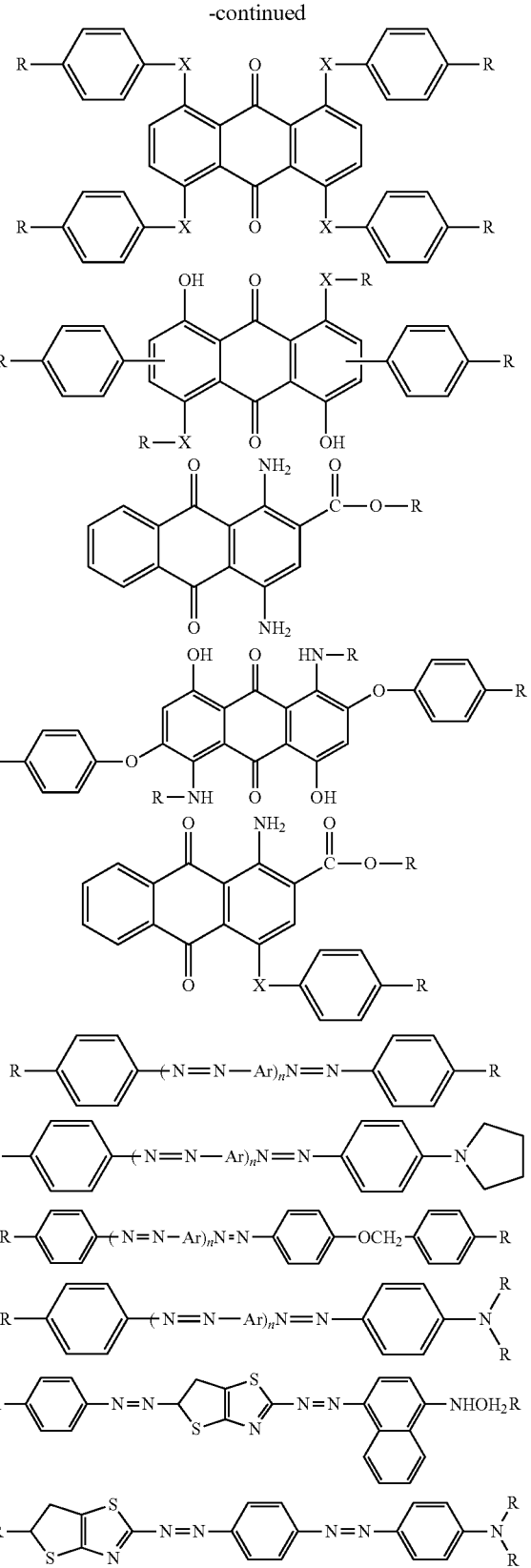

In the above formula, each X independently represents —NH— or —S—. n represents 0 or 1. Ar represents a phenylene group or a naphthylene group.

R represents a hydrogen atom, an alkyl group, an alkoxy group, a cyclohexyl group, a phenyl group, a phenylcyclohexyl group or a cyclohexylcyclohexyl group optionally having these substituents.

<Polymer Matrix>

A hydrophilic polymer is preferably used as the polymer matrix of the present invention. In this case, it is not particularly limited as long as it is hydrophilic, but it is preferable to be selected such that the refractive index matches with the ordinary refractive index (no) of the liquid crystal component. Typically, as the no of the liquid crystal component is around 1.5, the refractive index of the polymer matrix is preferably 1.45 or more and 1.55 or less.

As polymers constituting the polymer matrix, natural polymers such as gelatin and gum arabic; synthetic polymers such as polyvinyl alcohol, polyurethane, polyurea, polyacryl, polyamine, polyamide, polyethylene, polypropylene, polystyrene, and polyacrylonitrile; modified products thereof; copolymers such as methacrylate/acrylonitrile, urethane/acrylate, acrylate/acrylonitrile and the like; may be used. Also, a cross-linked structure may be introduced into the polymer using a cross-linking agent.

The polymer is preferably highly dispersible or soluble in water, and it is preferably gelatin, polyvinyl alcohol, polyurethane, polyurea, polyacryl, polyamine, and modified products thereof. It is more preferably at least one selected from the group consisting of polyurethanes, polyacrylics, polyvinyl alcohols and modified products thereof, still more preferably at least one selected from the group consisting of polyurethanes, polyacrylics and modified products thereof, and particularly preferably polyacrylic.

Only one kind of these polymers may be used, or two or more kinds may be mixed and used.

Polyurethanes are classified according to their polyisocyanate and polyol skeletons. Examples of polyisocyanate skeletons include aliphatic polyurethanes having an aliphatic carbon skeleton and aromatic polyurethanes containing aromatic rings in polyisocyanates. Among them, aliphatic polyurethane is preferable because of its high light resistance. Examples of the polyol skeleton include polyether-based, polyester-based, and polycarbonate-based. Of these, polyether-based materials are preferred because of their good film adhesion.

Polyacryl consists of polymers of various acrylate monomers. Examples of acrylic monomers include compounds represented by the following formula.

[Chem. 3]

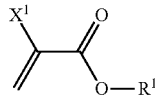

In the above formula, $X^1$ represents a hydrogen atom or a methyl group. $R^1$ represents a hydrogen atom, a halogen atom, a hydroxy group, optionally substituted linear or branched alkyl group having 1 to 20 carbon atoms, an optionally substituted linear or branched alkoxy group having 1 to 20 carbon atoms, or an optionally substituted cyclic hydrocarbon group having 1 to 10 carbon atoms.

Polyacryl may be copolymerized with monomers other than acrylate. The copolymers include acrylate-styrene, acrylate-vinyl acetate, acrylate-acrylonitrile, acrylate-urethane, acrylate-ester, acrylate-silicone, and the like. The main chain may be composed of copolymers of acrylate and other monomers, or other polymers may be grafted onto the polyacrylic main chain.

The polymer matrix may contain low-molecular weight substances within a range that does not impair the performance of the liquid crystal element of the present invention. Specific examples of the low-molecular weight substances include light stabilizers, antioxidants, thickeners, polymerization inhibitors, photosensitizers, adhesives, defoamers, surfactants, water-soluble dyes, and the like.

<Ratio of Liquid Crystal Composition to Polymer Matrix>

In the liquid crystal-polymer composite film of the present invention, the ratio of the total mass of the liquid crystal composition to the total mass of the polymer matrix is preferably 0.5 or more, and more preferably 1 or more with respect to 1 by mass of the total mass of the polymer matrix. Moreover, it is preferably 4 or less, and more preferably 3 or less. When the ratio of the total mass of the liquid crystal composition to the total mass of the polymer matrix is equal to or more than the above lower limit, the haze in the transparent state tends to be low and the driving voltage tends to be low. When the ratio of the total mass of the liquid crystal composition to the total mass of the polymer matrix is equal to or less than the above upper limit, the impact resistance and adhesion of the liquid crystal-polymer composite film tend to be improved.

[Substrate Having Transparent Conductive Layer]

A typical configuration of the substrate having a transparent conductive layer according to the present invention will be described below, but it is not limited to these.

Examples of substrate materials include inorganic transparent substances such as glass and quartz, and colorless and transparent substances such as metals, metal oxides, semiconductors, ceramics, plastic plates, and plastic films. A single plate of these substrates may be used, or a plurality of substrates may be laminated and used.

The substrate may be provided with a hard coat layer for the purpose of protecting it from scratches and stains, a sharp cut layer that blocks light in a specific wavelength range, or a bandpass layer.

The transparent conductive layer that constitutes the electrode is formed on the substrate by applying a thin layer of metal oxide, metal, semiconductor, organic conductive material, or the like on all or pant of the surface of the substrate by a known coating method, a printing method, a vapor deposition method s u c h as sputtering, or the like. Also, it may be partially etched after forming a conductive thin layer. In particular, in order to obtain a large-area liquid crystal element, from the viewpoint of productivity and workability, it is desirable to use an electrode-having substrate having an ITO (mixture of indium oxide and tin oxide) electrode-layer deposited on a transparent polymer film such as PET by a vapor deposition method such as sputtering, a printing method or the like.

Wiring may be provided on the substrate to connect between the electrodes or between the electrodes and the outside. For example, it may be an electrode substrate for segment driving, an electrode substrate for matrix driving, an electrode substrate for active matrix driving, or the like.

Furthermore, all or part of the electrode surface provided on the substrate may be covered with a protective film or an oriented film made of organic compounds such as polyimide, polyamide, silicone, and cyanide compounds, inorganic compounds such as $SiO_2$, $TiO_2$, and $ZrO_2$, or mixtures thereof.

The substrate may be subjected to an orientation treatment to orient the liquid crystal with respect to the substrate surface. In the case of orientation treatment, for example, both of the two substrates may be homogeneously oriented or homeotropically oriented, or may be a so-called hybrid in which one is homogeneously oriented and the other is homeotropically oriented. Direct rubbing of the electrode surface may be used for these orientation treatments. Ordinary oriented films such as polyimide used for TN liquid crystals, STN liquid crystals, or the like may also be used. Furthermore, a photo-orientation process may also be used.

The opposing substrate may have an adhesive layer containing a resin body that adheres and supports the substrate in the peripheral portion thereof as appropriate.

The end portion or the cut surface of the liquid crystal element in the present invention may be coated with tapes such as adhesive tape, thermocompression tape, thermosetting tape, thermosetting resin, photo setting resin, moisture setting resin, room temperature setting adhesive, anaerobic adhesive, curable resins or thermoplastic resins such as epoxy-based adhesives, silicone-based adhesives, fluorine resin adhesives, polyester-based adhesives, vinylchloride-based adhesives, or the like. As a result, it is possible to prevent the internal liquid crystal composition or the like from leaking out. In addition, in some cases, this sealing has the effect of preventing deterioration of the liquid crystal element. As a method for protecting the end face, the end face may be entirely covered, or a curable resin or thermoplastic resin may be poured into the liquid crystal element from the end and solidified. Furthermore, this part may be covered with tapes.

Spacers such as spherical or cylindrical glass, plastic, ceramic, or plastic films may be present between the substrates each having the transparent conductive layer that are arranged facing each other. The spacers may be present in the liquid crystal-polymer composite film between the substrates by including it as a component of the emulsion composition of the present invention. The spacers may be dispersed on the substrate during assembly of the liquid crystal element, or may be mixed with the adhesive and present in the adhesive layer.

[Method for Producing Liquid Crystal-Polymer Composite Film]

The liquid crystal-polymer composite film of the present invention can be produced by applying the emulsion composition of the present invention, which will be described later, onto a substrate having the transparent conductive layer and drying it. As the coating method, known coating methods such as bar coating, blade coating, knife coating, die coating, screen coating, micro gravure roll coating, reverse roll coating, kiss roll coating, dip roll coating, spin coating, spray coating or the like can be used. Depending on the properties of the substrate, the substrate may be washed as appropriate.

The wet film thickness during coating is preferably 10 µm or more, and more preferably 20 µm or more. Moreover, it is preferably 120 µm or less, and more preferably 100 µm or less. When the wet film thickness is equal to or more than the above lower limit, there is a tendency that the liquid crystal composition does not have unevenness and can be applied uniformly. When the wet film thickness is equal to or less than the above upper limit, the drive voltage tends to decrease to a practical value and the haze in the transparent state tends to decrease.

The drying temperature for drying the applied emulsion composition is preferably 40° C. or higher, and more preferably 50° C. or higher. Moreover, it is preferably 100° C. or lower and more preferably 80° C. or lower.

When the drying temperature is equal to or higher than the above lower limit, the drying time is shortened to a practical time, and the amount of water remaining in the film is reduced, which tends to improve the reliability of the liquid crystal element. When the drying temperature is equal to or lower than the above upper limit, there is a tendency that structural destruction such as coalescence and reverse phase formation of the emulsion composition during drying hardly occurs.

[Total Light Transmittance]

The total light transmittance in this specification is measured by the method specified in JIS K7136.

In this specification, light means visible light (wavelength 380 nm to 780 nm). The total light transmittance is measured in the visible light region.

The total light transmittance of the liquid crystal element of the present invention in the colored state is preferably 30% or less, more preferably 25% or less, and still more preferably 20% or less. When the total light transmittance in the colored state is equal to or less than the above upper limit, the amount of transmitted light in the colored state can be reduced, and accordingly there is a tendency that the light shielding property can be enhanced. On the other hand, the total light transmittance in the colored state is preferably 0.1% or more, more preferably 0.3% or more, and still more preferably 0.5% or more. When the total light transmittance in the colored state is equal to or higher than the above lower limit, there is a tendency that a wide dynamic range can be maintained.

The total light transmittance in the transparent state of the liquid crystal element of the present invention is preferably greater than 30%, more preferably 50% or more, and still more preferably 55% or more. Further, the total light transmittance in the transparent state is preferably 80% or less, and more preferably 70% or less. When the total light transmittance in the transparent state is within these ranges, the transparency of the element tends to be ensured.

The dynamic range of total light transmittance (the difference in total light transmittance between the colored state and the transparent state, ΔTT) of the liquid crystal element of the present invention is preferably 30 or more, and more preferably 35 or more. Within this range, the resulting element tends to be easily recognized.

[Haze]

The haze in this specification is measured by the method of JIS K7136.

From the viewpoint of transparency, the haze in the colored state of the liquid crystal element of the present invention is preferably 90% or less, more preferably 80% or less, and still more preferably 70% or less. When the haze in the colored state is equal to or less than the above upper limit value, the light absorption of the dichroic dye in the colored state can be relatively increased, and a colored state with a more transparent feeling can be obtained. On the other hand, the haze in the colored state is preferably 10% or more, more preferably 20% or more, and still more preferably 30% or more. When the haze in the colored state is equal to or higher than the above lower limit, there is a tendency that the glare of external light can be further reduced.

From the viewpoint of light-shielding properties, the haze in the colored state of the liquid crystal element of the present invention is preferably 80% or more, more preferably 90% or more, and still more preferably 95% or more. When the haze in the colored state is equal to or more than the above lower limit, the opportunity of light absorption by the dichroic dye due to multiple scattering increase, and the total light transmittance tends to be lower. On the other hand, the haze in the colored state is preferably 99% or less. When the haze in the colored state is equal to or less than the above upper limit, there is a tendency that the haze in the transparent state can be reduced.

The haze in the transparent state of the liquid crystal element of the present invention is preferably 16% or less, more preferably 10% or less, and still more preferably 6% or less. Further, the haze in the transparent state is preferably 0% or more, more preferably 1% or more. When the haze in the transparent state is within these ranges, there is a tendency to obtain a film having transparency and good visibility.

The haze dynamic range (difference in haze between the colored state and the transparent state, ΔHaze) of the liquid crystal element of the present invention is preferably 45 or more, and preferably 50 or more. Within this range, the contrast between light shielding and transparency tends to be clear, and the difference between whether the scenery seen through the film is visible/not visible tends to be clear.

(Emulsion Composition)

The emulsion composition of the present invention is an emulsion composition in which a liquid crystal composition is dispersed in a medium containing water. The medium is one in which a polymer is dispersed or dissolved. The liquid crystal composition contains a liquid crystal component and a dichroic dye. The liquid crystal component has a positive dielectric constant anisotropy and an NI point of 110° C. or more and 150° C. or less. The refractive index anisotropy of the liquid crystal component is 0.01 or more and 0.1 or less.

Although the liquid crystal composition contained in the emulsion composition of the present invention is not particularly limited, examples thereof include the liquid crystal composition used in the liquid crystal element of the present invention described above. Also, the medium containing water contained in the emulsion composition is not particularly limited, and examples thereof include pure water or a mixture of water and an organic solvent.

Examples of the organic solvent include alcohols, ketones, ethers, esters, carboxylic acids, and amines. The organic solvent may be water-soluble or oil-soluble to the extent that is slightly soluble in water. The organic solvent is preferably mixed in an amount that dissolves uniformly in water.

Polymers dispersed or dissolved in the medium include natural polymers such as gelatin and gum arabic; synthetic polymers such as polyvinyl alcohol, polyurethane, polyurea, polyacryl, polyamine, polyamide, polyethylene, polypropylene, polystyrene, and polyacrylonitrile; modified products thereof; copolymers such as methacrylate/acrylonitrile, urethane/acrylate, acrylate/acrylonitrile; and the like.

The polymer is preferably highly dispersible or soluble in water, and it is preferably gelatin, polyvinyl alcohol, polyurethane, polyurea, polyacryl, polyamine, and modified products thereof. More preferably, it is at least one selected from the group consisting of polyurethanes, polyacrylics, polyvinyl alcohols and modified products thereof, furthermore preferably at least one selected from the group consisting of polyurethanes, polyacrylics and modified products thereof, and particularly preferably polyacrylic.

Only one kind of polymer may be used, or two or more kinds may be mixed and used.

In the present invention, the term "polymer dispersion" refers to a state in which polymer droplets are suspended in a medium. The term "polymer dissolution" refers to a state in which the polymer is dissociated to a sufficiently small size by solvation to form a homogeneous system. Dispersion and dissolution of polymers are described in detail in "Shikizai" edited by General Incorporated Association Shikizai Kyokai (2004), Vol. 77, No. 4, pp. 169-176.

In the emulsion composition of the present invention, the liquid crystal composition is dispersed in a medium containing water. The liquid crystal composition may be dispersed in a liquid state, or may be dispersed in the form of microcapsule liquid crystals in which the periphery of the liquid crystal composition is encapsulated with a polymer, silica compound, inorganic nanoparticles, or the like.

Polymers that can be used as microcapsule liquid crystal capsules include natural polymers such as gelatin and gum arabic; synthetic polymers such as polyvinyl alcohol, polyurethane, polyurea, polyacryl, polyamine, polyamide, polyethylene, polypropylene, polystyrene, and polyacrylonitrile; modified products thereof; copolymers such as methacrylate/acrylonitrile, urethane/acrylate, acrylate/acrylonitrile; and the like.

The emulsion composition of the present invention may contain additives within a range that does not impair the performance of the liquid crystal element produced using it. Specific examples of additives include surfactants, emulsifiers, dispersants, anti-settling agents, film-forming aids, leveling agents, light stabilizers, antioxidants, thickeners, polymerization inhibitors, photosensitizers, adhesives, anti-foaming agents, water-soluble dyes, chiral agents and the like.

As for the size of the liquid crystal composition, the average droplet diameter is preferably 2 μm or more, and more preferably 5 μm or more, from the viewpoint of the transparency of the obtained liquid crystal element. Moreover, it is preferably 50 μm or less, and more preferably 30 μm or less. When the average droplet diameter is equal to or more than the above lower limit, light scattering of the obtained liquid crystal-polymer composite film tends to be weak, and the haze in the transparent state tends to be small. At the same time, the light scattering of the colored liquid crystal-polymer composite film is also weakened, so that the contribution of the dichroic dye to the light absorption is relatively improved, and it becomes possible to control the total light transmittance with a more transparent feeling. When the average droplet diameter is equal to or less than the above upper limit, the grainy feeling of the liquid crystal composition disappears, and the obtained liquid crystal element tends to have good appearance uniformity.

On the other hand, from the viewpoint of light-shielding properties of the obtained liquid crystal element, the average droplet diameter of the liquid crystal composition is preferably 0.01 μm or more, and more preferably 0.1 μm or more. Moreover, it is preferably less than 2 μm, and more preferably 1 μm or less. When the average droplet diameter is less than the above upper limit, the obtained liquid crystal-polymer composite film tends to have strong light scattering, a large haze in a light-shielding state, and a wide dynamic range (difference in haze between a colored state and a transparent state). Moreover, the opportunity for light absorption by the dichroic dye due to multiple scattering increases, the total light transmittance tends to be lower, and the dynamic range (difference in total light transmittance between the colored state and the transparent state) tends to increase. However, when the average droplet diameter is smaller than the above lower limit (much smaller than the wavelength of visible light), the effect is diminished, so the average droplet diameter of the liquid crystal composition is preferably equal to or more than the above lower limit.

The above average droplet diameter is the number-based median diameter. The shape and average droplet diameter of the liquid crystal composition are as described above for the liquid crystal composition of the present invention.

In the emulsion composition of the present invention, when the total mass of the polymer dispersed or dissolved in the medium is 1, the total mass of the liquid crystal composition is preferably 0.5 or more, and more preferably 1 or more. Moreover, it is preferably 4 or less, and more preferably 3 or less. When the total mass of the liquid crystal composition is equal to or more than the above lower limit with respect to the total mass of the polymer, the liquid crystal element obtained by using the emulsion composition of the present invention tends to have a low haze in a transparent state and a low driving voltage. When the total mass of the liquid crystal composition is equal to or less than the above upper limit with respect to the total mass of the polymer, the impact resistance and adhesion of the liquid crystal element obtained using the emulsion composition of the present invention tend to be improved.

[Liquid Crystal Component]

The liquid crystal component contained in the liquid crystal composition is not particularly limited, and examples thereof include the liquid crystal component used in the liquid crystal element of the present invention described above.

The dielectric constant anisotropy ($\Delta\varepsilon$) of the liquid crystal component is positive. In this case, it becomes a normal mode in which a colored state is obtained when no voltage is applied, and a transparent state is obtained when a voltage is applied.

In addition, the NI point (nematic phase-isotropic phase transition temperature) of the liquid crystal component is 110° C. or higher and 150° C. or lower, preferably 120° C. or higher and 140° C. or lower. When the NI point is equal to or higher than the above lower limit, there is a tendency that the dynamic range of change in transmittance can be maintained even in continuous driving at a high temperature of about 90° C. Also, the higher the NI point, the wider the dynamic range of transmittance change. On the other hand, when the NI point rises, the lower temperature limit of the nematic phase also tends to rise. Therefore, from the viewpoint of operation at a low temperature, the NI point is preferably equal to or less than the above upper limit.

The method for measuring the NI point of the liquid crystal composition is as described above.

The refractive index anisotropy ($\Delta n$) of the liquid crystal component is 0.01 or more, preferably 0.02 or more, and more preferably 0.03 or more. Moreover, it is 0.1 or less, and preferably 0.10 or less. When $\Delta n$ is equal to or less than the upper limit, light scattering at the interface between the polymer matrix and the liquid crystal composition is reduced, and haze in the transparent state tends to be reduced. On the other hand, when $\Delta n$ is equal to or greater than the above lower limit, the order parameter of the liquid crystal composition tends to increase.

The method for measuring the refractive index anisotropy of the liquid crystal component is as described above.

As the liquid crystal contained in the liquid crystal component, a nematic liquid crystal, a cholesteric liquid crystal, a smectic liquid crystal, and the like can be used. Nematic liquid crystals or cholesteric liquid crystals are preferred because they are available at low cost. Further, a chiral agent may be added to the nematic liquid crystal to form a cholesteric liquid crystal (a chiral nematic liquid crystal). When using a cholesteric liquid crystal (a chiral nematic liquid crystal), the reciprocal number (1/p) of the chiral pitch p [µm] is preferably 0.01 to 0.5 [/µm], and particularly preferably 0.01 to 0.3 [/µm]. When the reciprocal of the chiral pitch is equal to or more than the above lower limit, the light absorption efficiency of the dichroic dye increases, and the light shielding property in the colored state can be improved. When the reciprocal of the chiral pitch is equal to or less than the above upper limit, voltage rise can be suppressed.

Specific examples of the case of using a known liquid crystalline substance as a liquid crystal component are as described above in the description of the liquid crystal component of the present invention, and specific exemplary compounds thereof are also as described above.

[Dichroic Dye]

The dichroic dye contained in the liquid crystal composition is not particularly limited, and includes the dichroic dye used in the liquid crystal element of the present invention as described above. Among them, an anthraquinone-based dye and/or an azo-based dye are preferable because they tend to have a large absorption coefficient, high solubility in liquid crystals, and high light resistance.

A single kind of dichroic dye may be used, or a mixture of multiple kinds may be used. Although not particularly limited, the dichroic dye preferably contains 20% by mass or more and more preferably 50% by mass or more of the anthraquinone-based and/or azo-based type.

Although not particularly limited, the content of the dichroic dye with respect to 100% by mass of the liquid crystal composition is preferably 0.1% by mass or more, more preferably 1% by mass or more, and still more preferably 3% by mass or more. Also, the content of the dichroic dye is preferably 20% by mass or less, more preferably 15% by mass or less, and still more preferably 10% by mass or less based on 100% by mass of the liquid crystal composition.

When the content of the dichroic dye is equal to or higher than the above lower limit, the liquid crystal element obtained using the emulsion composition of the present invention exhibits a large light absorption in the colored state, and the amount of transmitted light tends to be small. When the content of the dichroic dye is equal to or less than the above upper limit, separation and precipitation of the dichroic dye are less likely to occur, and the reliability of the liquid crystal element tends to improve.

[Method for Producing Emulsion Composition]

Although the method for producing the emulsion composition of the present invention is not particularly limited, it can be produced, for example, by the following method.

Production method (1) The liquid crystal composition, which is the oil phase, and the medium containing water, which is the water phase, are mixed, and after an emulsification process, a liquid in which the polymer is dispersed or dissolved in the medium containing water is added.

Production method (2) The liquid crystal composition, which is the oil phase, is mixed with a liquid in which a polymer is dispersed or dissolved in a medium containing water, which is the water phase, and an emulsification step is performed.

Production method (3) Microcapsule liquid crystal powder or slurry in which the periphery of the liquid crystal composition is encapsulated with polymer, silica compound, inorganic nanoparticles, or the like is mixed with a medium containing water, and after a dispersion process, a liquid in which a polymer is dispersed or dissolved in a medium containing water is added.

Production method (4) The powder or slurry of the microcapsule liquid crystal is mixed with a liquid in which a polymer is dispersed or dissolved in a medium containing water, and a dispersion step is performed.

Among these, production method (1) and production method (3) are preferable, since they can perform the emulsification step or the dispersion step while the mixture is in a state of low viscosity, so that they can be performed with low energy, and the droplet size of the liquid crystal composition can be easily controlled.

A commercially available aqueous resin emulsion can be used as the liquid in which the polymer is dispersed or dissolved in the medium containing water. Specific examples are shown below.

Water-based urethane emulsion: NeoRez R-9660, NeoRez R-972, NeoRez R-9637, NeoRez R-9679, NeoRez R-960, NeoRez R-2170, NeoRez R-966, NeoRez R-967, NeoRez R-986, NeoRez R-9603, NeoRez R-4000, NeoRez R-9404, NeoRez R-600, NeoRez R-650, NeoRez R-1010 manufactured by DSM; Superflex 126, Superflex 130, Superflex 150, Superflex 150HS, Superflex 170, Superflex 210, Superflex 300, Superflex 420, Superflex 420NS, Superflex 460, Superflex 460S, Superflex 470, Superflex 500M, Superflex 620, Superflex 650, Superflex 740, Superflex 820, Superflex 830HS, Superflex 860, Superflex 870, Superflex E-2000, Superflex E-4800 manufactured by DKS Co. Ltd.; Neosticker 200, Neosticker 400, Neosticker 700, Neosticker 1200, Neosticker X-7096, Evaphanol HA-107C, Evaphanol HA-50C, Evaphanol HA-170, Evaphanol HA-560, Evaphanol HA-15, Evaphanol AP-12, Evaphanol APC-55 manufactured by NICCA CHEMICAL Co. Ltd.

Water-based acrylic emulsion: NeoCryl A-633, NeoCryl A-639, NeoCryl A-655, NeoCryl A-662, NeoCryl A-1091, NeoCryl A-1092, NeoCryl A-1093, NeoCryl A-1094, NeoCryl A-2091, NeoCryl A-2092, NeoCryl A-6016, NeoCryl A-6057, NeoCryl A-6069, NeoCryl A-6092, NeoCryl A-614, NeoCryl A-550, NeoCryl A-1105, NeoCryl A-1125, NeoCryl A-1127, NeoCryl XK-12, NeoCryl XK-16, NeoCryl XK-30, NeoCryl XK-36, NeoCryl XK-52, NeoCryl XK-190, NeoCryl XK-188, NeoCryl XK-240 manufactured by DSM; Licabond 702, Licabond 727, Licabond 743N, Licabond 745, Licabond 752, Licabond 801, Licabond 940, Licabond 972, Licabond 1711, Licabond 1752, Licabond 6520, Licabond 6720, Licabond 7110, Licabond 7180, Licabond 7525, Licabond 7820, Licabond 8020, Licabond 8030, Licabond DM60, Licabond DM772, Licabond DM774, Licabond LDM6740, Licabond LDM7522, Licabond LDM7523, Licabond ES-65, Licabond ES-90, Licabond ES-620, Licabond ET-700, Licabond ET-831, Licabond HS-5, Licabond HS-531, Licabond AP-601, Licabond AP-96, Licabond AP-620, Licabond AP-700, Licabond AP-80, Licabond 710A, Licabond 730L, Licabond 731L, Licabond 952B, Licabond 966A, Licabond 7320, Licabond 7400, Licabond FK-420, Licabond FK-64S, Licabond FK-66IS, FK-66N, FK-68H, Licabond FK-471, Licabond FK-475, Licabond FK-489, Licabond FK-284, Licabond FK-600S, Licabond FK-3830, Licabond FK-3840, Licabond FK-6100, Movinyl VDM7410, Movinyl 4061, Movinyl 4080, Movinyl 4090, Movinyl 4050, Movinyl S-71, Movinyl 461, Movinyl 650, Movinyl AP-60L, Movinyl 490 manufactured by Japan Coating Resin Corporation; ThreeBond 1549, ThreeBond 1549B, ThreeBond 1555C, ThreeBond 1555D manufactured by Three Bond.

Among them, NeoRez R-966, NeoRez R-967, NeoCryl A-1125, NeoCryl A-1127, Licabond FK-471, Licabond ES-620, Licabond LDM7522, Movinyl 4061, Movinyl 4080, Movinyl 4090, and ThreeBond 1549 are preferable because these have excellent dispersion stability in the oil phase.

In order to obtain a stable emulsion, it is preferable to add a surfactant or a dispersion stabilizer at a stage prior to the emulsification process or dispersion process. The surfactant is not particularly limited, and may be ionic or nonionic, may be low-molecular-weight or high-molecular-weight, and may be non-reactive or reactive.

Although the amount of the surfactant added is not particularly limited, it is preferably 0.1% by mass or more, and more preferably 0.5% by mass or more, relative to the liquid crystal composition. Moreover, it is preferably 20 mass % or less, and more preferably 10 mass % or less. When the amount of the surfactant added is within the above range, the dispersion of the emulsion tends to be stabilized and the droplet size of the liquid crystal composition can be controlled within the desired range.

The surfactant may be added to the liquid crystal composition or added to a medium containing water, depending on the solubility.

Examples of surfactants include the following.

Anionic surfactants such as carboxylates, sulfonates, sulfates, and phosphates;

Cationic surfactants such as amine salts and quaternary ammonium salts;

Amphoteric surfactants such as alkylamino fatty acid salts, alkylamine oxides, betaines, sulfobetaines, amidosulfobetaines, carbobetaines, and imidazolines;

Nonionic surfactants such as ether types such as polyoxyethylene alkyl ether, polyoxyethylene alkyl aryl ether, polyoxyethylene aralkyl ether, polyoxyethylene aralkyl aryl ether, polyoxyethylene polyoxypropylene block adduct, alkyl glucoside, polyether-modified silicone; ester types such as glycerin fatty acid esters, sorbitan fatty acid esters, and sucrose fatty acid esters; ester-ether types such as polyoxyethylene fatty acid esters, polyoxyethylene sorbitan fatty acid esters, and polyoxyethylene sucrose fatty acid esters; acetyl types such as acetyl-modified polyvinyl alcohol; fatty acid alkanolamides.

Among these, anionic surfactants are preferable because of their high water solubility and dispersion stability, and sulfonates are particularly preferable. Nonionic surfactants are preferred because they tend to increase the electrical reliability of liquid crystal elements. Among them, ether type or ester type is preferable, and polyoxyethylene alkyl ether, polyoxyethylene alkyl aryl ether, polyoxyethylene aralkyl ether, polyoxyethylene aralkyl aryl ether, polyoxyethylene polyoxypropylene block adduct and the like are particularly preferable.

There are no particular limitations on the dispersion stabilizer, but examples include the following.

Polymers such as polyvinyl alcohol, polyvinylpyrrolidone, methylcellulose, hydroxyethylcellulose, hydroxypropylcellulose, hydroxypropylmethylcellulose, polyethylene glycol, polyacrylic acid, polymethacrylic acid, polyurethane, polyamine, polyamide, polyether, maleic acid copolymer, gelatin, starch, chitosan, cornstarch and modified products thereof;

Copolymers such as methacrylate/acrylonitrile, urethane/acrylate, acrylate/acrylonitrile;

Inorganic oxide fine particles such as silica fine particles, titania fine particles, and alumina fine particles:

Among these, polyvinyl alcohol and modified products thereof, polyurethane, polyamide, and the like are preferable due to their high dispersion stability.

Examples of dispersion stabilizers include those exemplified as polymers constituting the polymer matrix. When the dispersion stabilizer, which is a polymer, is contained in the emulsion composition or the liquid crystal-polymer composite film, it is contained as a polymer constituting the polymer matrix.

The degree of saponification of polyvinyl alcohol is preferably 80 mol % or more, and more preferably 85 mol % or more. Moreover, it is preferably 95 mol % or less, and more preferably 91 mol % or less. When the degree of saponification is within these ranges, the solubility in a medium containing water tends to be high.

The degree of polymerization of polyvinyl alcohol is preferably 100 or more, and more preferably 300 or more. Moreover, it is preferably 2500 or less, and more preferably 1000 or less. When the degree of polymerization is within these ranges, the film tends to be excellent in flexibility.

Specific examples of polyvinyl alcohol include Gohsenol GL-03, Gohsenol GL-05, Gohsenol GM-14L, Gohsenol GM14, Gohsenol GH-17, Gohsenol GH-17R, Gohsenol GH-20, Gohsenol GH-23, Gohsenol AL-06, Gohsenol P-610, Gohsenol C-500 manufactured by Nippon Synthetic Chemical Co., Ltd.; Kuraray Poval 25-88KL, Kuraray Poval 32-97KL, Kuraray Poval 3-86SD, Kuraray Poval 105-88KX, Kuraray Poval 200-88KX manufactured by Kuraray Co., Ltd.; Denka Poval H-12, Denka Poval H-17, Denka Poval H-24, Denka Poval B-05, Denka Poval B-17, Denka Poval B-20, Denka Poval B-24, Denka Poval B-33 manufactured by Denka.

In the production of the emulsion composition, the emulsification method and the dispersion method are not particularly limited. Examples of the method include a method of mechanical crushing of droplets using a stirrer, homogenizer, homomixer, disperser, high-pressure emulsifier, blender, colloid mill, ultrasonic disperser, or the like; and a method of extruding a liquid through pores using a porous membrane, microchannel, inkjet, or the like.

Among the above methods, when an emulsion composition having an average droplet diameter of 2 μm or more and 50 μm or less is produced, a method (membrane emulsification method) in which a liquid is extruded through pores using a porous membrane is preferably used. The method is preferred because the precise droplet size distribution can be precisely controlled to a certain value and is easy to manufacture. The porous film is not particularly limited, but Shirasu porous glass or the like can be used.

When producing an emulsion composition having an average droplet diameter of the liquid crystal composition of 0.01 μm or more and less than 2 μm, an emulsion composition having an average droplet diameter of the liquid crystal composition of 2 μm or more and 50 μm or less is first produced by a membrane emulsification method or the like. Further, the droplets are mechanically crushed using a high-pressure emulsifier or an ultrasonic disperser. By doing so, it is possible to easily produce a uniform emulsion composition.

A cross-linking agent may be contained in the emulsion composition. A cross-linking agent tends to improve the water resistance and impact resistance of the liquid crystal-polymer composite film.

The cross-linking agent is not particularly limited, but examples include the following.

Epoxy-based compounds such as ethylene glycol diglycidyl ether, polyethylene glycol diglycidyl ether, propylene glycol diglycidyl ether, polypropylene glycol diglycidyl ether, glycerol diglycidyl ether, polyglycerin polyglycidyl ether, and diglycidylaniline;

Epoxysilane-based compounds such as γ-glycidoxypropyltrimethoxysilane, γ-glycidoxypropyltriethoxysilane, γ-glycidoxypropyldimethoxymethylsilane, γ-glycidoxypropyldiethoxymethylsilane, β-(3,4-epoxycyclohexyl) ethyltrimethoxysilane, and β-(3,4-epoxycyclohexyl) ethyltriethoxysilane;

Aminosilane-based compounds such as 3-aminopropyltrimethoxysilane, 3-aminopropyltriethoxysilane, N-(2-aminoethyl)-3-aminopropyltrimethoxysilane, and N-(2-aminoethyl)-3-aminopropylmethyldimethoxysilane;

Mercaptosilane-based compounds such as γ-mercaptopropyltrimethoxysilane;

Hydrazide-based compounds such as carbodihydrazide, oxalic acid dihydrazide, adipic acid dihydrazide, sebacic acid dihydrazide, and isophthalic acid dihydrazide;

Semicarbazide resin;

Polycarbodiimide-based resin;

Aziridine-based (ethyleneimino group-containing) compounds such as tetramethylolmethane-tris(β-aziridinylpropionate), trimethylolpropane-tris(β-aziridinylpropionate), methylenebis [N-(1-aziridinylcarbonyl)-4-aniline], N,N'-hexamethylenebis(1-aziridinecarboxamide), and N,N'-hexaaminoethylene-1,6-bis(1-aziridinecarboxamide);

Acetoacetoxy group-containing compound;

Oxazoline group-containing compound;

Polyethylene polyamine;

Polyethylene imine;

Polyamide polyamine;

Polyamide polyurea;

Alkylated polymethylolmelamine; glyoxal;

Water-dispersed isocyanate;

Blocked isocyanate;

Carbodiimide group-containing compound;

Bisvinyl sulfone;

Lactic acid titanate.

When using epoxy-based compounds and epoxysilane-based compounds, catalysts such as imidazole-based compounds, amine-based compounds, and phosphorus-based compounds may be added.

Among the above, hydrazide compounds, oxazoline group-containing compounds, carbodiimide group-containing compounds, and blocked isocyanates are preferred because of their high cross-linking speed and low toxicity.

The polymer and cross-linking agent can be used in any combination. Preferred combinations include polyurethane and an oxazoline group-containing compound, polyurethane and a carbodiimide group-containing compound, polyurethane and a blocked isocyanate, and polyacryl and a hydrazide compound, because of their high cross-linking reactivity. From the viewpoint of the stability of the resulting emulsion composition, a combination of polyacryl and a carbodiimide group-containing compound is preferred.

The amount of the cross-linking agent added is not particularly limited, but it is preferably 0.1% by mass or more, and more preferably 1% by mass or more, relative to the polymer to be cross-linked. Moreover, it is preferably 20% by mass or less, and more preferably 10% by mass or less. When the amount of the cross-linking agent added is within the above range, the liquid crystal-polymer composite film tends to be improved in water resistance and impact resistance and retain flexibility.

The timing of adding the cross-linking agent may be a one-liquid type in which it is added to the emulsion composition from the beginning, or a two-liquid type in which it is added immediately before application to a substrate.

The viscosity of the emulsion composition of the present invention is preferably 10 mPa·s or more, and more preferably 100 mPa·s or more. Moreover, it is preferably 10000 mPa·s or less, and more preferably 2000 mPa·s or less. When the viscosity is within the above range, it becomes easy to form a liquid crystal-polymer composite film having a uniform film thickness, and the coating speed can be increased, which tends to increase productivity.

In order to keep the viscosity of the emulsion composition of the present invention within the above range, a viscosity modifier such as a thickening agent, a thixotropic agent, or a viscosity reducing agent may be used.

[Chem. 4]

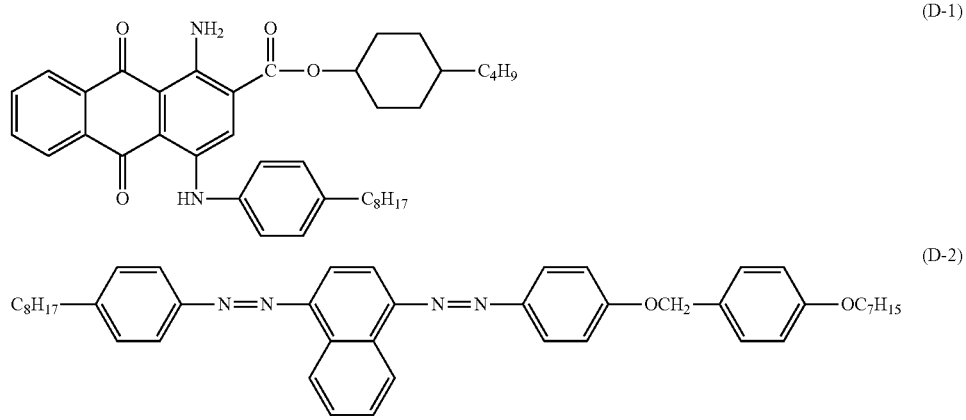

The viscosity modifier is not particularly limited, but includes those exemplified as the dispersion stabilizer.

The content of the liquid crystal composition in the emulsion composition is preferably 20% by mass or more, and more preferably 30% by mass or more. Moreover, it is preferably 70 mass % or less, and more preferably 65 mass % or less. When the content of the liquid crystal composition is within the above range, repelling that occurs when the emulsion composition is applied to a substrate is suppressed. In addition, it tends to be easier to keep the droplet size of the liquid crystal composition and the viscosity of the emulsion composition within the above ranges.

The particle size of the polymer used in the emulsion composition is preferably 1 nm or more, and more preferably 10 nm or more. Also, it is preferably 1000 nm or less, and more preferably 200 nm or less. When the particle size of the polymer is within the above range, it tends to be easier to keep the viscosity of the emulsion composition within the above range.

The molecular weight of the polymer is preferably $1.0 \times 10^3$ or more, and more preferably $1.0 \times 10^4$ or more. Moreover, it is preferably $1.0 \times 10^6$ or less, and more preferably $1.0 \times 10^5$ or less. When the molecular weight of the polymer is within the above range, it tends to be easier to keep the viscosity of the emulsion composition within the above range.

EXAMPLE

The present invention will be described in more detail below with reference to examples. The present invention is not limited by the following examples as long as the gist thereof is not exceeded.

Example 1

A black liquid crystal composition (L-1) was obtained by mixing a nematic liquid crystal having Δn=0.09 and an NI point=125° C. as a liquid crystal component, an anthraquinone-based cyan dichroic dye represented by (D-1) below, an azo-based yellow dichroic dye represented by (D-2) below, the azo-based magenta dichroic dye NKX-3739 manufactured by Hayashibara Co., Ltd., and the chiral agent (CB-15) in the following formulation, and dissolving the dichroic dyes.

<Formulation of Liquid Crystal Composition>
Nematic liquid crystal: 92.0% by mass
D-1: 3.4% by mass
D-2: 0.6% by mass
NKX-3739: 1.0% by mass
CB-15: 3.0% by mass
Content of dichroic dye with respect to 100% by mass of liquid crystal composition: 5% by mass An o/w emulsion (E-1) was obtained by adding 50% by mass of a 1.5% by mass sodium dodecylbenzenesulfonate aqueous solution to 50% by mass of the liquid crystal composition (L-1), and emulsifying the mixture by passing it through Shirasu porous glass.

A white latex (W-1) was obtained by adding 7% by mass of polyvinyl alcohol Gosenol GH-17R (manufactured by Mitsubishi Chemical Co., Ltd.) to 93% by mass of water-based acrylic emulsion Licabond ES-620 (manufactured by Japan Coating Resin Co., Ltd.) and stirring.

An emulsion composition (I-1) was obtained by adding 45 parts by mass of the white latex (W-1) to 55 parts by mass of the o/w emulsion (E-1), and stirring until uniform.

The average droplet dimeter of the liquid crystal composition in the emulsion composition (I-1) was 10 μm. Assuming that the mass of the polymer (P-1) dispersed or dissolved in the aqueous phase in the emulsion composition (I-1) is 1, the mass of the liquid crystal composition (L-1) is 1.14.

A film-substrate obtained by forming a transparent ITO electrode layer on a PET film having a thickness of 125 μm was used as a substrate. The emulsion composition (I-1) was applied on the ITO layer of this substrate by bar coating, and dried at 50° C. to obtain a liquid crystal-polymer composite layer having a thickness of 30 μm.

When this liquid crystal-polymer composite layer was observed from its surface with a microscope, it was found that a liquid crystal composition having an average droplet diameter of 10 μm was dispersed in the polymer matrix.

The film-substrate having the liquid crystal-polymer composite film formed thereon and another film-substrate were laminated face to face at 80° C. to obtain a liquid crystal element (F-1). The liquid crystal element (F-1) was flexible and was able to be cut and shaped with scissors. That is, this liquid crystal element (F-1) was able to be cut and shaped.

The liquid crystal element (F-1) exhibited normal mode driving, in which it turned black when an applying voltage was off and turned transparent when the voltage (rectangular wave with a frequency of 100 Hz and 50 Vrms) was on. When the voltage was off, the haze was 70.3% and the total light transmittance was 23.9%. When a voltage of 100 Vrms was applied, the haze was 9.6% and the total light transmittance was 54.5%.

Example 2

A black liquid crystal composition (L-2) was obtained in the same manner as in Example 1, except that a nematic liquid crystal having Δn=0.08 and an NI point=140° C. was used as the liquid crystal component.

An o/w emulsion (E-2) was obtained by adding 50% by mass of a 1.5% by mass sodium dodecylbenzenesulfonate aqueous solution to 50% by mass of the liquid crystal composition (L-2), and emulsifying the mixture by passing it through Shirasu porous glass.

An emulsion composition (I-2) was obtained by adding 45 parts by mass of the white latex (W-1) to 55 parts by mass of the o/w emulsion (E-2), and stirring until uniform.

The average droplet diameter of the liquid crystal composition in the emulsion composition (I-2) was 10 μm. Assuming that the mass of the polymer (P-1) dispersed or dissolved in the aqueous phase in the emulsion composition (I-2) is 1, the mass of the liquid crystal composition (L-2) is 1.15.

A liquid crystal element (F-2) was obtained in the same manner as in Example 1 using the emulsion composition (I-2). When the liquid crystal-polymer composite film of the liquid crystal element (F-2) was observed from its surface with a microscope, it was found that a liquid crystal composition having an average droplet diameter of 10 μm was dispersed in the polymer matrix. The liquid crystal element (F-2) was flexible and was able to be cut and shaped with scissors. That is, this liquid crystal element (F-2) was able to be cut and shaped.

The liquid crystal element (F-2) exhibited normal mode driving, in which it turned black when an applying voltage was off and turned transparent when the voltage (rectangular wave with a frequency of 100 Hz and 50 Vrms) was on. When the voltage was off, the haze was 72.8% and the total light transmittance was 25.2%. When a voltage of 100 Vrms was applied, the haze was 15.8% and the total light transmittance was 55.2%.

Comparative Example 1

A black liquid crystal composition (L-3) was obtained in the same manner as in Example 1, except that a nematic liquid crystal having Δn=0.08 and an NI point=96° C. was used as the liquid crystal component.

An o/w emulsion (E-3) was obtained by adding 50% by mass of a 1.5% by mass sodium dodecylbenzenesulfonate aqueous solution to 50% by mass of the liquid crystal composition (L-3), and emulsifying the mixture by passing it through Shirasu porous glass.

An emulsion composition (I-3) was obtained by adding 45 parts by mass of the white latex (W-1) to 55 parts by mass of the o/w emulsion (E-3), and stirring until uniform.

The average droplet diameter of the liquid crystal composition in the emulsion composition (I-3) was 10 μm. Assuming that the mass of the polymer (P-1) dispersed or dissolved in the aqueous phase in the emulsion composition (I-3) is 1, the mass of the liquid crystal composition (L-3) is 1.14.

A liquid crystal element (F-3) was obtained in the same manner as in Example 1 using the emulsion composition (I-3). When the liquid crystal-polymer composite film of the liquid crystal element (F-3) was observed from its surface with a microscope, it was found that a liquid crystal composition having an average droplet diameter of 10 μm was dispersed in the polymer matrix. The liquid crystal element (F-3) was flexible and was able to be cut and shaped with scissors. That is, this liquid crystal element (F-3) was able to be cut and shaped.

The liquid crystal element (F-3) exhibited normal mode driving, in which it turned black when an applying voltage was off and turned transparent when the voltage (rectangular wave with a frequency of 100 Hz and 50 Vrms) was on. When the voltage was off, the haze was 72.0% and the total light transmittance was 19.1%. When a voltage of 100 Vrms was applied, the haze was 9.5% and the total light transmittance was 46.7%.

Example 3

The liquid crystal element (F-1) obtained in Example 1 was placed in a constant temperature bath at a temperature of 90° C. and continuously driven by applying a rectangular wave having a frequency of 100 Hz and 50 Vrms. Continuous driving was started, and after 65 hours, 133 hours, and 228 hours, the liquid crystal element was taken out, returned to room temperature, and haze and total light transmittance were measured in the same manner as in Example 1. When the respective differences (dynamic ranges) at the time of ON and OFF are expressed as ΔHaze and ΔTT, no significant change from the initial value was observed. The results are shown in Table 1 below.

TABLE 1

| | | Initial Value | After 65 hours | After 133 hours | After 228 hours |
|---|---|---|---|---|---|
| Haze (%) | OFF | 70.3 | 59.6 | 53.3 | 51.0 |
| | ON | 9.6 | 6.5 | 3.2 | 2.0 |
| | ΔHaze | 60.7 | 53.1 | 50.1 | 49.1 |
| Total Light Transmittance (%) | OFF | 23.9 | 27.9 | 28.4 | 28.4 |
| | ON | 54.5 | 55.7 | 56.2 | 55.9 |
| | ΔTT | 30.6 | 27.9 | 27.8 | 27.6 |

Example 4

The liquid crystal element (F-2) obtained in Example 2 was placed in a constant temperature bath at a temperature of 90° C., and continuously driven in the same manner as in Example 3 by applying a rectangular wave having a frequency of 100 Hz and 50 Vrms.

Continuous driving was started, and after 65 hours, 133 hours, and 228 hours, the liquid crystal element was taken out, returned to room temperature, and haze and total light transmittance were measured. When the difference between ON and OFF is expressed as ΔHaze and ΔTT, no significant change from the initial value was observed. The results are shown in Table 2 below.

TABLE 2

|  |  | Initial Value | After 65 hours | After 133 hours | After 228 hours |
|---|---|---|---|---|---|
| Haze (%) | OFF | 72.8 | 67.9 | 63.5 | 60.0 |
|  | ON | 15.8 | 12.4 | 8.6 | 6.5 |
|  | ΔHaze | 57.0 | 55.5 | 54.9 | 53.5 |
| Total Light Transmittance (%) | OFF | 25.2 | 28.4 | 28.7 | 29.1 |
|  | ON | 55.2 | 58.0 | 59.0 | 59.4 |
|  | ΔTT | 30.0 | 29.6 | 30.4 | 30.3 |

Comparative Example 2

The liquid crystal element (F-3) obtained in Comparative Example 1 was placed in a constant temperature bath at a temperature of 90° C., and continuously driven in the same manner as in Example 3 by applying a rectangular wave having a frequency of 100 Hz and 50 Vrms.

Continuous driving was started, and after 65 hours, 133 hours, and 228 hours, the liquid crystal element was taken out, returned to room temperature, and haze and total light transmittance were measured. When the difference between ON and OFF is expressed as ΔHaze and ΔTT, a large decrease was observed after 65 hours. The results are shown in Table 3 below.

TABLE 3

|  |  | Initial Value | After 65 hours | After 133 hours | After 228 hours |
|---|---|---|---|---|---|
| Haze (%) | OFF | 72.0 | 41.7 | 42.9 | 37.5 |
|  | ON | 9.5 | 9.0 | 12.3 | 11.2 |
|  | ΔHaze | 62.5 | 32.7 | 30.6 | 26.3 |
| Total Light Transmittance (%) | OFF | 19.1 | 27.4 | 26.5 | 27.2 |
|  | ON | 46.7 | 45.5 | 43.8 | 43.4 |
|  | ΔTT | 27.6 | 18.1 | 17.3 | 16.2 |

The haze (dynamic range ΔHaze) and the total light transmittance (dynamic range ΔTT) after 65 hours, 133 hours, and 228 hours from the start of continuous driving of Examples 3 and 4 and Comparative Example 2 are shown in FIGS. 1 and 2.

The above Examples and Comparative Example show that the change width (dynamic range) of the visible light transmittance of the liquid crystal element is high, and the dynamic range is maintained even after driving at high temperature, when the NI point of the liquid crystal component is within a specific range.

Example 5

The o/w emulsion (E-1) prepared in Example 1 was subjected to ultrasonic dispersion for 10 minutes using an ultrasonic dispersion machine (UH-600) manufactured by SMTE Co., Ltd. to obtain an o/w emulsion (E-5).

An emulsion composition (I-5) was obtained by adding 45 parts by mass of the white latex (W-1) to 55 parts by mass of the o/w emulsion (E-5), and stirring until uniform.

The average droplet diameter of the liquid crystal composition in the emulsion composition (I-5) was 0.2 μm. Assuming that the mass of the polymer (P-1) dispersed or dissolved in the aqueous phase in the emulsion composition (I-5) is 1, the mass of the liquid crystal composition (L-1) is 1.14.

A liquid crystal element (F-5) was obtained in the same manner as in Example 1 using the emulsion composition (I-5). When the liquid crystal-polymer composite film of the liquid crystal element (F-5) was observed from its surface with a microscope, it was found that a liquid crystal composition having an average droplet diameter of 0.2 μm was dispersed in the polymer matrix. The liquid crystal element (F-5) was flexible and was able to be cut and shaped with scissors. That is, this liquid crystal element (F-5) was able to be cut and shaped.

The liquid crystal element (F-5) exhibited normal mode driving, in which it turned black when an applying voltage was off and turned transparent when the voltage (rectangular wave with a frequency of 100 Hz and 50 Vrms) was on. When the voltage was off, the haze was 74.0% and the total light transmittance was 22.7%. When a voltage of 100 Vrms was applied, the haze was 5.7% and the total light transmittance was 66.3%.

Example 6

The o/w emulsion (E-2) prepared in Example 2 was subjected to ultrasonic dispersion for 10 minutes using an ultrasonic dispersion machine (UH-600) manufactured by SMTE Co., Ltd. to obtain an o/w emulsion (E-6).

An emulsion composition (I-6) was obtained by adding 45 parts by mass of the white latex (W-1) to 55 parts by mass of the o/w emulsion (E-6), and stirring until uniform.

The average droplet diameter of the liquid crystal composition in the emulsion composition (I-6) was 0.2 μm. Assuming that the mass of the polymer (P-1) dispersed or dissolved in the aqueous phase in the emulsion composition (I-6) is 1, the mass of the liquid crystal composition (L-2) is 1.16.

A liquid crystal element (F-6) was obtained in the same manner as in Example 1 using the emulsion composition (I-6). When the liquid crystal-polymer composite film of the liquid crystal element (F-6) was observed from its surface with a microscope, it was found that a liquid crystal composition having an average droplet diameter of 0.2 μm was dispersed in the polymer matrix. The liquid crystal element (F-6) was flexible and was able to be cut and shaped with scissors. That is, this liquid crystal element (F-6) was able to be cut and shaped.

The liquid crystal element (F-6) exhibited normal mode driving, in which it turned black when an applying voltage was off and turned transparent when the voltage (rectangular wave with a frequency of 100 Hz and 50 Vrms) was on. When the voltage was off, the haze was 67.7% and the total light transmittance was 25.8%. When a voltage of 100 Vrms was applied, the haze was 8.8% and the total light transmittance was 59.8%.

Comparative Example 3

The o/w emulsion (E-3) prepared in Comparative Example 1 was subjected to ultrasonic dispersion for 10 minutes using an ultrasonic dispersion machine (UH-600) manufactured by SMTE Co., Ltd. to obtain an o/w emulsion (E-7).

An emulsion composition (I-7) was obtained by adding 45 parts by mass of the white latex (W-1) to 55 parts by mass of the o/w emulsion (E-7), and stirring until uniform.

The average droplet diameter of the liquid crystal composition in the emulsion composition (I-7) was 0.2 μm. Assuming that the mass of the polymer (P-1) dispersed or dissolved in the aqueous phase in the emulsion composition (I-7) is 1, the mass of the liquid crystal composition (L-3) is 1.14.

A liquid crystal element (F-7) was obtained in the same manner as in Example 1 using the emulsion composition (I-7). When the liquid crystal-polymer composite film of the liquid crystal element (F-7) was observed from its surface with a microscope, it was found that a liquid crystal composition having an average droplet diameter of 0.2 μm was dispersed in the polymer matrix. The liquid crystal element (F-7) was flexible and was able to be cut and shaped with scissors. That is, this liquid crystal element (F-7) was able to be cut and shaped.

The liquid crystal element (F-7) exhibited normal mode driving, in which it turned black when an applying voltage was off and turned transparent when the voltage (rectangular wave with a frequency of 100 Hz and 50 Vrms) was on. When the voltage was off, the haze was 59.6% and the total light transmittance was 27.1%. When a voltage of 100 Vrms was applied, the haze was 8.4% and the total light transmittance was 54.4%.

Example 7

The liquid crystal element (F-5) obtained in Example 5 was placed in a constant temperature bath at a temperature of 90° C., and continuously driven by applying a rectangular wave having a frequency of 100 Hz and 50 Vrms. Continuous driving was started, and after 65 hours, 133 hours, and 228 hours, the liquid crystal element was taken out, returned to room temperature, and haze and total light transmittance were measured in the same manner as in Example 1. When the respective differences (dynamic ranges) at the time of ON and OFF are expressed as ΔHaze and ΔTT, no significant change from the initial value was observed. The results are shown in Table 4 below.

TABLE 4

|  |  | Initial Value | After 65 hours | After 133 hours | After 228 hours |
|---|---|---|---|---|---|
| Haze (%) | OFF | 74.0 | 65.1 | 62.9 | 62.1 |
|  | ON | 5.7 | 5.1 | 5.2 | 5.0 |
|  | ΔHaze | 68.3 | 60.0 | 57.8 | 57.2 |
| Total Light Transmittance (%) | OFF | 22.7 | 29.3 | 29.5 | 29.8 |
|  | ON | 66.3 | 58.0 | 56.9 | 57.1 |
|  | ΔTT | 33.5 | 28.8 | 27.4 | 27.3 |

Example 8

The liquid crystal element (F-6) obtained in Example 6 was placed in a constant temperature bath at a temperature of 90° C., and continuously driven in the same manner as in Example 7 by applying a rectangular wave having a frequency of 100 Hz and 50 Vrms.

Continuous driving was started, and after 65 hours, 133 hours, and 228 hours, the liquid crystal element was taken out, returned to room temperature, and haze and total light transmittance were measured. When the difference between ON and OFF is expressed as ΔHaze and ΔTT, no significant change from the initial value was observed. The results are shown in Table 5 below.

TABLE 5

|  |  | Initial Value | After 65 hours | After 133 hours | After 228 hours |
|---|---|---|---|---|---|
| Haze (%) | OFF | 67.7 | 63.1 | 60.9 | 59.0 |
|  | ON | 8.8 | 8.0 | 7.7 | 7.5 |
|  | ΔHaze | 58.9 | 55.1 | 53.1 | 51.4 |
| Total Light Transmittance (%) | OFF | 25.8 | 30.0 | 30.7 | 31.4 |
|  | ON | 59.8 | 62.1 | 61.6 | 61.9 |
|  | ΔTT | 33.9 | 32.1 | 31.0 | 30.5 |

Comparative Example 4

The liquid crystal element (F-7) obtained in Comparative Example 3 was placed in a constant temperature bath at a temperature of 90° C., and continuously driven in the same manner as in Example 7 by applying a rectangular wave with a frequency of 100 Hz and 50 Vrms.

Continuous driving was started, and after 65 hours, 133 hours, and 228 hours, the liquid crystal element was taken out, returned to room temperature, and haze and total light transmittance were measured. Assuming that the difference between ON and OFF is expressed as ΔHaze and ΔTT, a large decrease was observed after 65 hours. The results are shown in Table 6 below.

TABLE 6

|  |  | Initial Value | After 65 hours | After 133 hours | After 228 hours |
|---|---|---|---|---|---|
| Haze (%) | OFF | 59.6 | 47.0 | 38.0 | 36.2 |
|  | ON | 8.4 | 10.2 | 6.1 | 9.3 |
|  | ΔHaze | 51.3 | 36.8 | 31.9 | 26.9 |
| Total Light Transmittance (%) | OFF | 27.1 | 33.7 | 35.2 | 35.1 |
|  | ON | 54.4 | 52.9 | 53.7 | 51.7 |
|  | ΔTT | 27.3 | 19.1 | 18.4 | 16.6 |

The haze (dynamic range ΔHaze) and the total light transmittance (dynamic range ΔTT) after 65 hours, 133 hours, and 228 hours from the start of continuous driving of Examples 7 and 8 and Comparative Example 4 are shown in FIGS. 3 and 4.

The above Examples and Comparative Example show that the change width (dynamic range) of the visible light transmittance of the liquid crystal element is high, and the dynamic range is maintained even after driving at high temperature, when the NI point of the liquid crystal component is within a specific range.

Example 9

A black liquid crystal composition (L-8) was obtained by mixing in the same manner as in Example 1 except that a nematic liquid crystal having Δn=0.096 and an NI point=130.6° C. was used as the liquid crystal component.

An o/w emulsion (E-8) was obtained by adding 50% by mass of a 1.5% by mass sodium dodecylbenzenesulfonate aqueous solution to 50% by mass of the liquid crystal composition (L-8), and emulsifying the mixture by passing it through Shirasu porous glass.

An emulsion composition (I-8) was obtained by adding 45 parts by mass of the white latex (W-1) to 55 parts by mass of the o/w emulsion (E-8), and stirring until uniform.

The average droplet diameter of the liquid crystal composition in the emulsion composition (I-8) was 10 μm. Assuming that the mass of the polymer (P-1) dispersed or dissolved in the aqueous phase in the emulsion composition (I-8) is 1, the mass of the liquid crystal composition (L-8) is 1.17.

A liquid crystal element (F-8) was obtained in the same manner as in Example 1 using the emulsion composition (I-8). When the liquid crystal-polymer composite film of the liquid crystal element (F-8) was observed from its surface with a microscope, it was found that a liquid crystal composition having an average droplet diameter of 10 μm was dispersed in the polymer matrix. The liquid crystal element (F-8) was flexible and was able to be cut and shaped with scissors. That is, this liquid crystal element (F-8) was able to be cut and shaped.

The liquid crystal element (F-8) exhibited normal mode driving, in which it turned black when an applying voltage was off and turned transparent when the voltage (rectangular wave with a frequency of 100 Hz and 50 Vrms) was on. When the voltage was off, the haze was 73.1% and the total light transmittance was 23.7%. When a voltage of 100 Vrms was applied, the haze was 7.2% and the total light transmittance was 56.3%.

Example 10

A black liquid crystal composition (L-9) was obtained by mixing in the same manner as in Example 1, except that a nematic liquid crystal having Δn=0.095 and an NI point=129.5° C. was used as the liquid crystal component.

An o/w emulsion (E-9) was obtained by adding 50% by mass of a 1.5% by mass sodium dodecylbenzenesulfonate aqueous solution to 50% by mass of the liquid crystal composition (L-9), and emulsifying the mixture by passing it through Shirasu porous glass.

An emulsion composition (I-9) was obtained by adding 45 parts by mass of the white latex (W-1) to 55 parts by mass of the o/w emulsion (E-9), and stirring until uniform.

The average droplet diameter of the liquid crystal composition in the emulsion composition (I-9) was 10 μm. Assuming that the mass of the polymer (P-1) dispersed or dissolved in the aqueous phase in the emulsion composition (I-9) is 1, the mass of the liquid crystal composition (L-9) is 1.25.

A liquid crystal element (F-9) was obtained in the same manner as in Example 1 using the emulsion composition (I-9). When the liquid crystal-polymer composite film of the liquid crystal element (F-9) was observed from its surface with a microscope, it was found that a liquid crystal composition having an average droplet diameter of 10 μm was dispersed in the polymer matrix. The liquid crystal element (F-9) was flexible and was able to be cut and shaped with scissors. That is, this liquid crystal element (F-9) was able to be cut and shaped.

The liquid crystal element (F-9) exhibited normal mode driving, in which it turned black when an applying voltage was off and turned transparent when the voltage (rectangular wave with a frequency of 100 Hz and 50 Vrms) was on. When the voltage was off, the haze was 72.5% and the total light transmittance was 24.4%. When a voltage of 100 Vrms was applied, the haze was 7.6% and the total light transmittance was 57.3%.

Comparative Example 5

A black liquid crystal composition (L-10) was obtained by mixing in the same manner as in Example 1 except that a nematic liquid crystal having Δn=0.164 and an NI point=120.7° C. was used as the liquid crystal component.

An o/w emulsion (E-10) was obtained by adding 50% by mass of a 1.5% by mass sodium dodecylbenzenesulfonate aqueous solution to 50% by mass of the liquid crystal composition (L-10), and emulsifying the mixture by passing it through Shirasu porous glass.

An emulsion composition (I-10) was obtained by adding 45 parts by mass of the white latex (W-1) to 55 parts by mass of the o/w emulsion (E-10), and stirring until uniform.

The average droplet diameter of the liquid crystal composition in the emulsion composition (I-10) was 10 μm. Assuming that the mass of the polymer (P-1) dispersed or dissolved in the aqueous phase in the emulsion composition (I-10) is 1, the mass of the liquid crystal composition (L-10) is 1.17.

A liquid crystal element (F-10) was obtained in the same manner as in Example 1 using the emulsion composition (I-10). When the liquid crystal-polymer composite film of the liquid crystal element (F-10) was observed from its surface with a microscope, it was found that a liquid crystal composition having an average droplet diameter of 10 μm was dispersed in the polymer matrix. The liquid crystal element (F-10) was flexible and was able to be cut and shaped with scissors. That is, this liquid crystal element (F-10) was able to be cut and shaped.

The liquid crystal element (F-10) exhibited normal mode driving, in which it turned black when an applying voltage was off and turned transparent when the voltage (rectangular wave with a frequency of 100 Hz and 50 Vrms) was on. When the voltage was off, the haze was 83.3% and the total light transmittance was 24.7%. When a voltage of 100 Vrms was applied, the haze was 18.2% and the total light transmittance was 58.0%.

Comparative Example 6

A black liquid crystal composition (L-ii) was obtained by mixing in the same manner as in Example 1, except that a nematic liquid crystal having Δn=0.195 and an NI point=129.9° C. was used as the liquid crystal component.

An o/w emulsion (E-11) was obtained by adding 50% by mass of a 1.5% by mass sodium dodecylbenzenesulfonate aqueous solution to 50% by mass of the liquid crystal composition (L-11), and emulsifying the mixture by passing it through Shirasu porous glass.

An emulsion composition (I-11) was obtained by adding 45 parts by mass of the white latex (W-1) to 55 parts by mass of the o/w emulsion (E-11), and stirring until uniform.

The average droplet diameter of the liquid crystal composition in the emulsion composition (I-11) was 10 μm. Assuming that the mass of the polymer (P-1) dispersed or dissolved in the aqueous phase in the emulsion composition (I-11) is 1, the mass of the liquid crystal composition (L-11) is 1.17.

A liquid crystal element (F-11) was obtained in the same manner as in Example 1 using the emulsion composition (I-11). When the liquid crystal-polymer composite film of the liquid crystal element (F-11) was observed from its surface with a microscope, it was found that a liquid crystal composition having an average droplet diameter of 10 μm was dispersed in the polymer matrix. The liquid crystal element (F-11) was flexible and was able to be cut and shaped with scissors. That is, this liquid crystal element (F-11) was able to be cut and shaped.

The liquid crystal element (F-11) exhibited normal mode driving, in which it turned black when an applying voltage was off and turned transparent when the voltage (rectangular wave with a frequency of 100 Hz and 50 Vrms) was on. When the voltage was off, the haze was 84.3% and the total light transmittance was 26.6%. When a voltage of 100 Vrms was applied, the haze was 22.2% and the total light transmittance was 60.1%.

Although the dynamic ranges of the haze and total light transmittance of the liquid crystal elements (F-10) and (F-11) produced in Comparative Examples 5 and 6 were about the same as those of Examples 9 and 10, they had a high haze and lacked transparency when the voltage was applied.

Although the present invention has been described in detail using specific embodiments, it is apparent to those skilled in the art that various modifications can be made without departing from the spirit and scope of the present invention.

This application is based on Japanese Patent Application 2021-31559 filed on Mar. 1, 2021, which is incorporated by reference in its entirety.

The invention claimed is:

1. A liquid crystal element comprising:
two substrates having a transparent conductive layer formed thereon, the two substrates being arranged so that the transparent conductive layer is between the two substrates, and
a liquid crystal-polymer composite film sandwiched between the two substrates having a transparent conductive layer,
wherein the liquid crystal-polymer composite film comprises a polymer matrix and a liquid crystal composition surrounded by the polymer matrix,
the liquid crystal composition contains a liquid crystal component and a dichroic dye,
the liquid crystal component has positive dielectric constant anisotropy, and has a nematic phase-isotropic phase transition temperature (an NI point) of 110° C. or higher and 150° C. or lower,
the liquid crystal component has a refractive index anisotropy of 0.01 or more and 0.1 or less, and
the liquid crystal-polymer composite film is switched between a transparent state and a colored state by applying a voltage.

2. The liquid crystal element according to claim 1, wherein the liquid crystal composition has an average droplet diameter of 2 μm or more and 50 μm or less.

3. The liquid crystal element according to claim 1, wherein the liquid crystal composition has an average droplet diameter of 0.01 μm or more and less than 2 μm.

4. The liquid crystal element according to claim 1, wherein the dichroic dye contains an anthraquinone dye and/or an azo dye.

5. The liquid crystal element according to claim 1, wherein a content of the dichroic dye with respect to 100% by mass of the liquid crystal composition is 0.1% by mass or more and 20% by mass or less.

6. The liquid crystal element according to claim 1, wherein the liquid crystal component is a nematic liquid crystal or a chiral nematic liquid crystal.

7. The liquid crystal element according to claim 1, wherein a polymer constituting the polymer matrix contains at least one selected from the group consisting of polyurethane, polyacryl, polyvinyl alcohol and a modified product thereof.

8. The liquid crystal element according to claim 1, wherein a total light transmittance in the colored state is 0.1% or more and 30% or less.

9. The liquid crystal element according to claim 1, wherein a total light transmittance in the transparent state is more than 30% and 80% or less.

10. An emulsion composition comprising the liquid crystal composition according to claim 1 and a medium containing water,
wherein the liquid crystal composition is dispersed in the medium containing water, and
a polymer is dispersed or dissolved in the medium.

11. The emulsion composition according to claim 10, wherein the liquid crystal composition in the emulsion composition has an average droplet diameter of 2 μm or more and 50 μm or less.

12. The emulsion composition according to claim 10, wherein the liquid crystal composition in the emulsion composition has an average droplet diameter of 0.01 μm or more and less than 2 μm.

13. The emulsion composition according to claim 10, wherein the dichroic dye contains an anthraquinone dye and/or an azo dye.

14. The emulsion composition according to claim 10, wherein a content of the dichroic dye with respect to 100% by mass of the liquid crystal composition is 0.1% by mass or more and 20% by mass or less.

15. The emulsion composition according to claim 10, wherein the liquid crystal component is a nematic liquid crystal or a chiral nematic liquid crystal.

16. The emulsion composition according to claim 10, wherein the polymer contains at least one selected from the group consisting of polyurethane, polyacryl, polyvinyl alcohol and a modified product thereof.

17. The liquid crystal element according to claim 1, wherein the liquid crystal component has the nematic phase-isotropic phase transition temperature (an NI point) of 120° C. or higher and 140° C. or lower.

18. The liquid crystal element according to claim 1, wherein the liquid crystal component has the refractive index anisotropy of 0.1 or more and 0.1 or less.

19. The liquid crystal element according to claim 1, wherein the liquid crystal composition has an average droplet diameter of 5 μm or more and 30 μm or less.

20. The liquid crystal element according to claim 1, wherein the liquid crystal composition excludes sorbitan fatty acid esters.

* * * * *